United States Patent [19]

Kikuchi et al.

[11] Patent Number: 4,809,067
[45] Date of Patent: Feb. 28, 1989

[54] METHOD AND APPARATUS FOR ENCODING TRANSMITTING AND RECEIVING IMAGE BY PULSE CODE MODULATION

[75] Inventors: Hiroaki Kikuchi; Kenichi Asano; Okikazu Tanno; Naofumi Goda, all of Tokyo, Japan

[73] Assignee: Mitsubishi Denki Kabushiki Kaisha, Tokyo, Japan

[21] Appl. No.: 53,627

[22] Filed: May 26, 1987

[30] Foreign Application Priority Data

| May 26, 1986 | [JP] | Japan | 61-120371 |
|---|---|---|---|
| Jun. 17, 1986 | [JP] | Japan | 61-140890 |
| Dec. 9, 1986 | [JP] | Japan | 61-293144 |
| Dec. 24, 1986 | [JP] | Japan | 61-309573 |
| Dec. 26, 1986 | [JP] | Japan | 61-313197 |

[51] Int. Cl.$^4$ .................................. H04N 7/13
[52] U.S. Cl. .................................... 358/135; 358/136
[58] Field of Search ............... 358/105, 136, 135, 133, 358/12, 260, 261; 375/122, 27; 340/347 AD

[56] References Cited

U.S. PATENT DOCUMENTS

| 4,307,420 | 12/1981 | Ninomiya et al. | 358/105 X |
|---|---|---|---|
| 4,558,350 | 12/1985 | Murakami | 358/21 R |
| 4,560,977 | 12/1985 | Murakami et al. | 340/347 AD |
| 4,591,908 | 5/1986 | Hirano | 358/136 |
| 4,668,987 | 5/1987 | Matsuda et al. | 358/136 |
| 4,670,851 | 6/1987 | Murakami et al. | 358/136 X |
| 4,672,441 | 6/1987 | Hoelzlwimmer et al. | 358/136 X |
| 4,689,672 | 8/1987 | Furukawa et al. | 358/136 |

OTHER PUBLICATIONS

Linde et al., "An Algorithm for Vector Quantizer Design", IEEE Transactions on Communications, vol. COM-28, No. 1, Jan. 1980, pp. 84-95.
Gersho-"On the Structure of Vector Quantization", IEEE Transactions on Information Theory, vol. IT-28, No. 2, Mar. 1982, pp. 157-166.
Buzo et al., "Speech Coding Based Upon Vector Quantization", IEEE Transactions on Acoustics, Speech, and Signal Processing, vol. ASSP-28, No. 5, Oct. 1980, pp. 562-574.

Primary Examiner—Howard W. Britton
Assistant Examiner—Victor R. Kostak
Attorney, Agent, or Firm—Bernard, Rothwell & Brown

[57] ABSTRACT

An image encoding/transmitting apparatus and method implemented by applying the vector quantization technology utilizing the differential pulse code modulation system in which an estimated error signal is compared with a threshold value to generate a change or movement detection signal and a differential signal, which are then quantized so as to be transmitted and received wherein the polarity of the differential signal is judged by a polarity judgment circuit, a polarity is assigned to the threshold value based on the judgment value by a polarity adding circuit, the differential signal is corrected depending on the threshold value with the polarity, and the corrected differential signal is quantized so as to be transmitted and received.

8 Claims, 25 Drawing Sheets

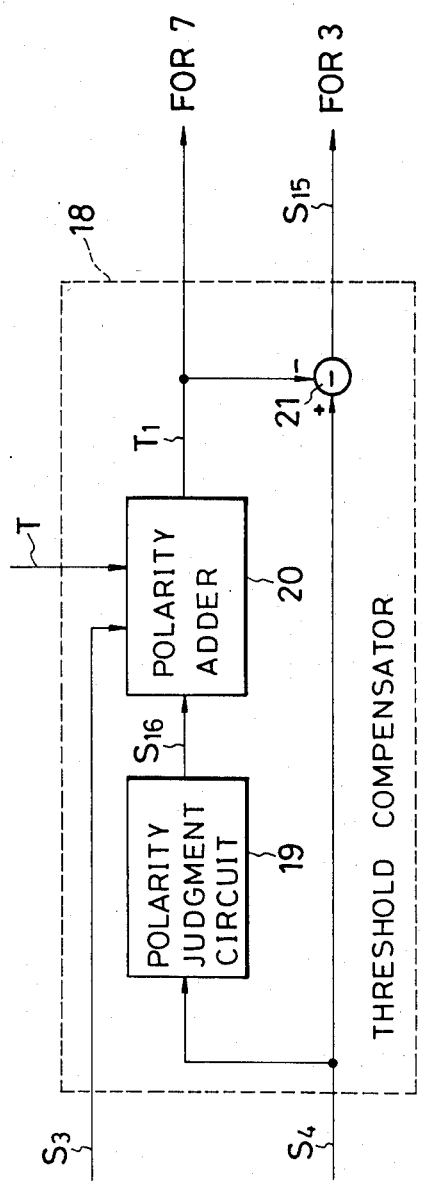
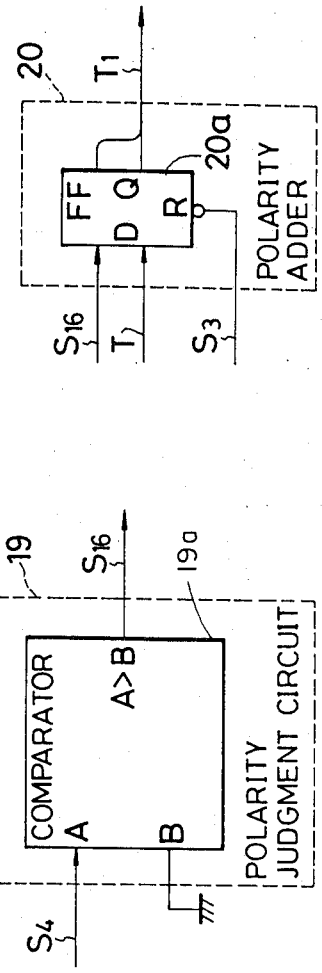
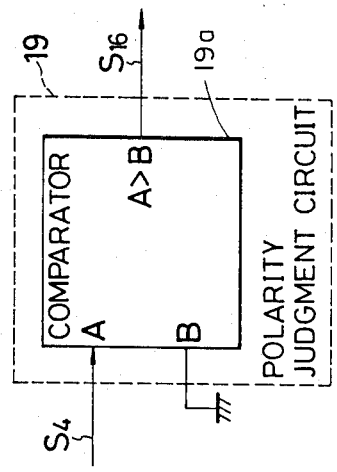
FIG.5A
FIG.5B
FIG.5C

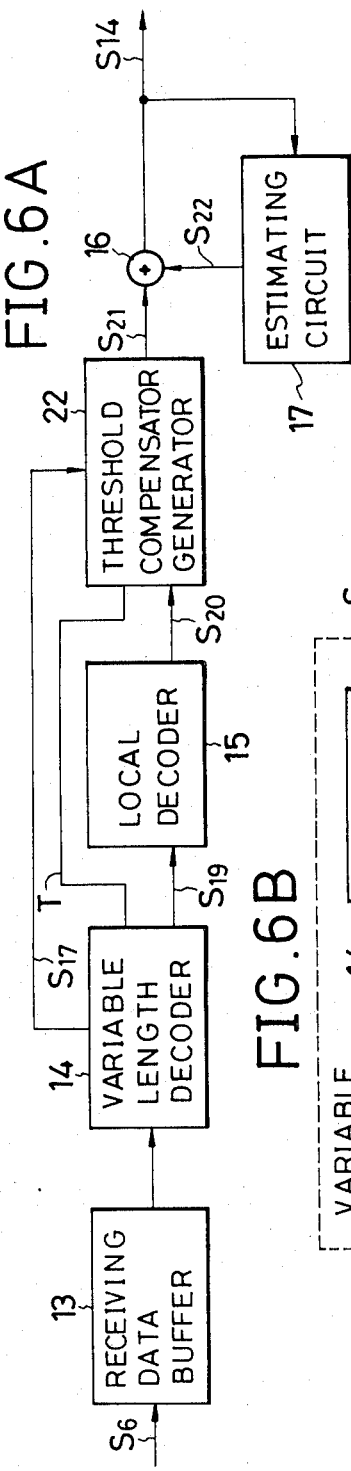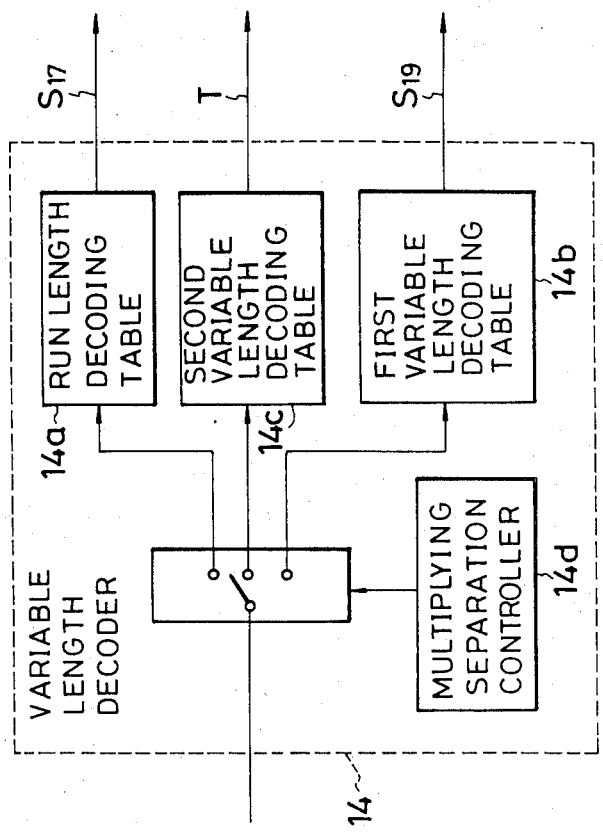

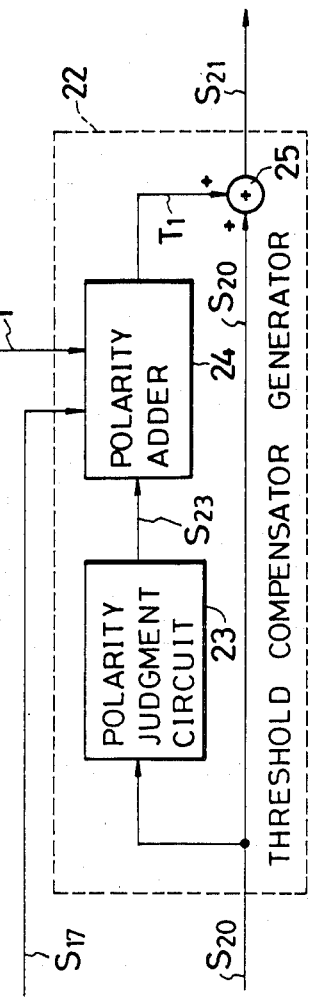
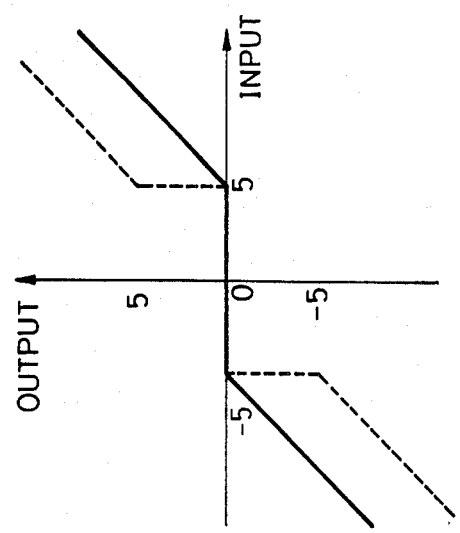
FIG.7A
FIG.7B
FIG.7C

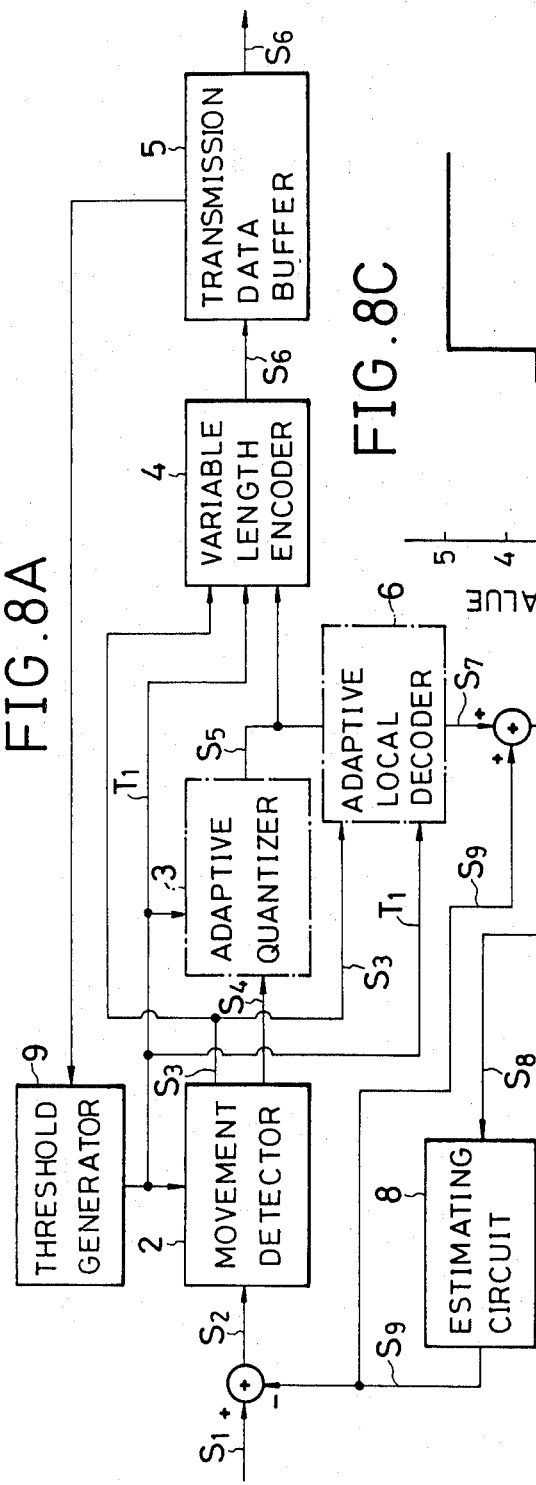
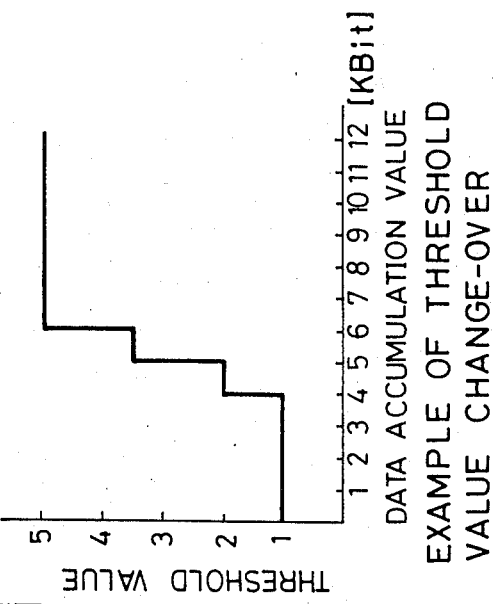
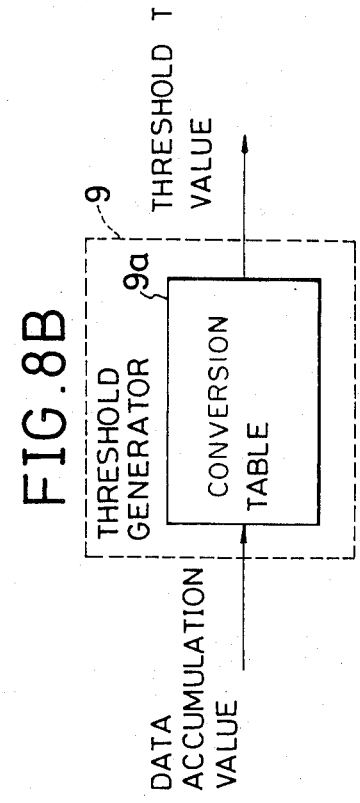

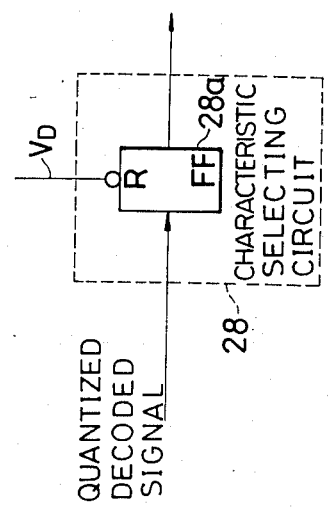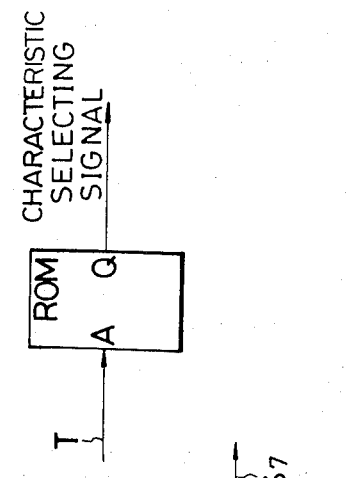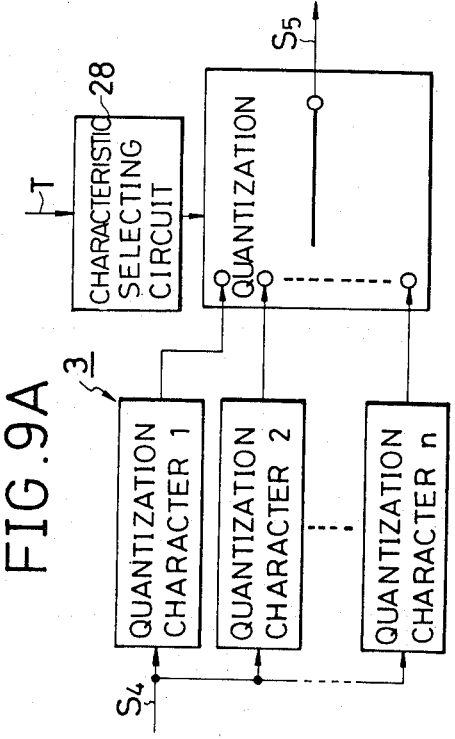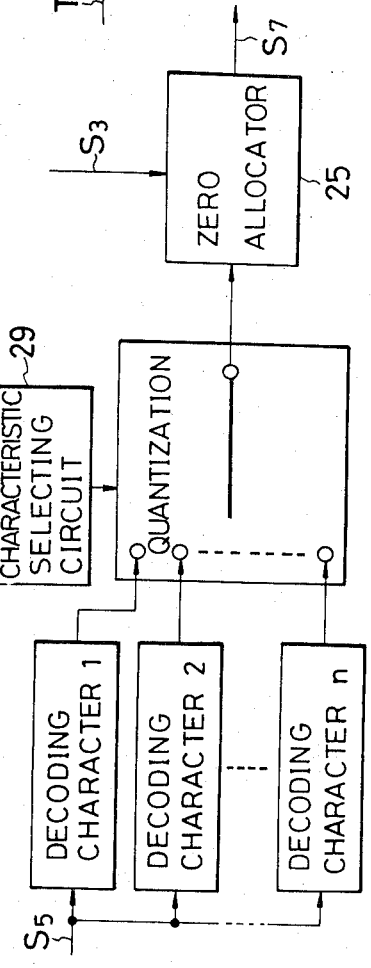

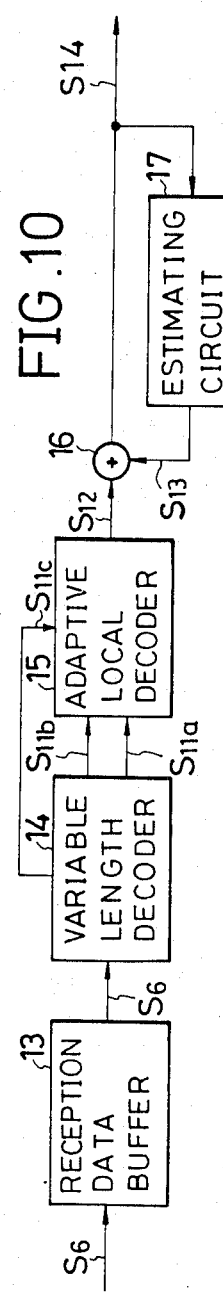
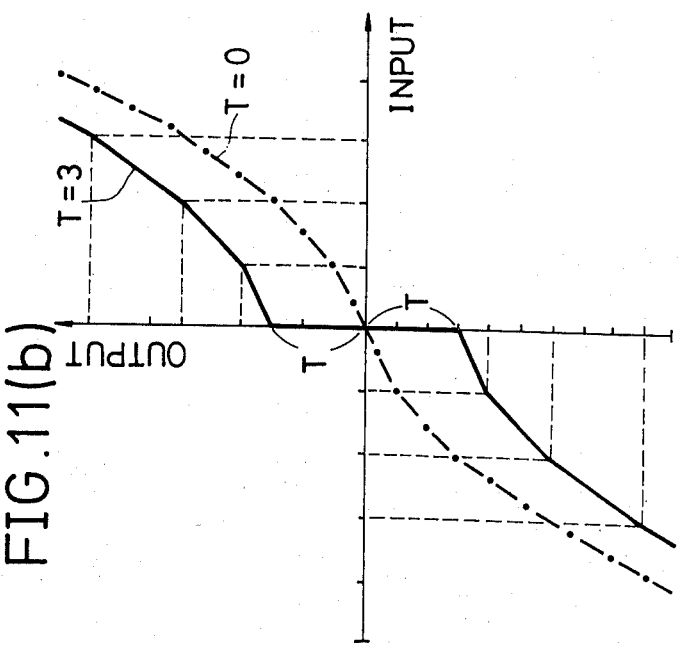
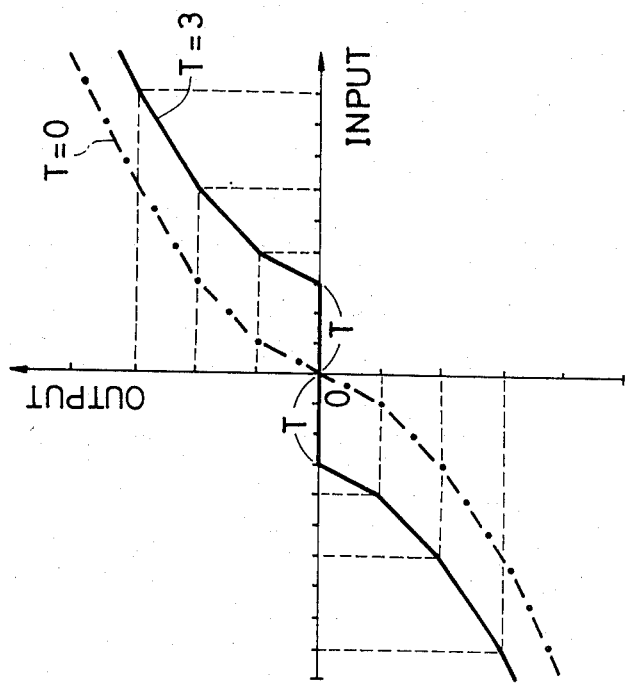
FIG.10
FIG.11(a)
FIG.11(b)

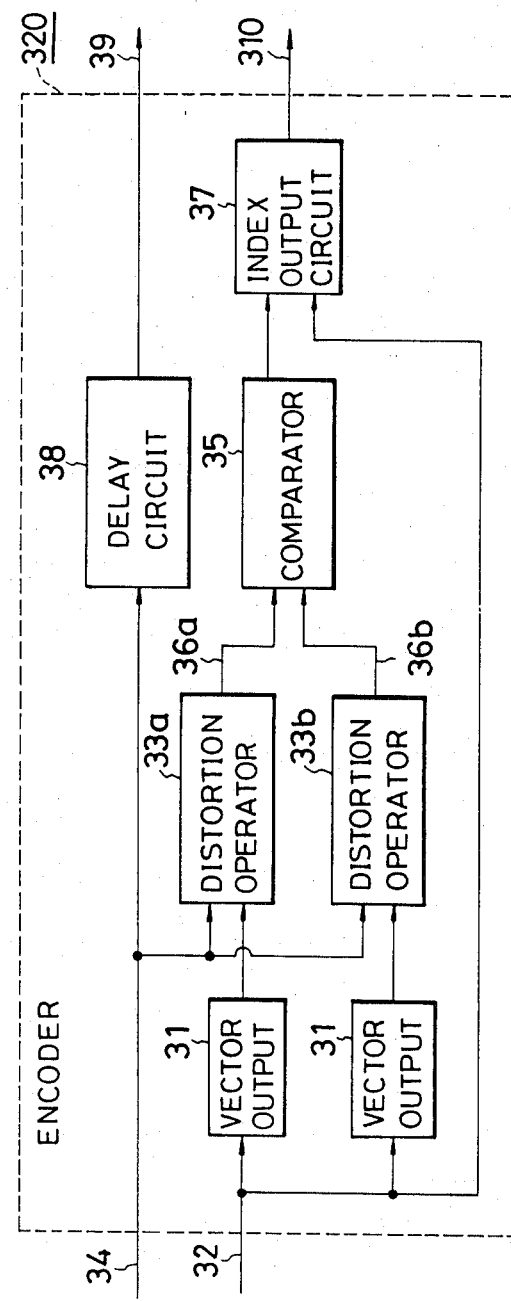
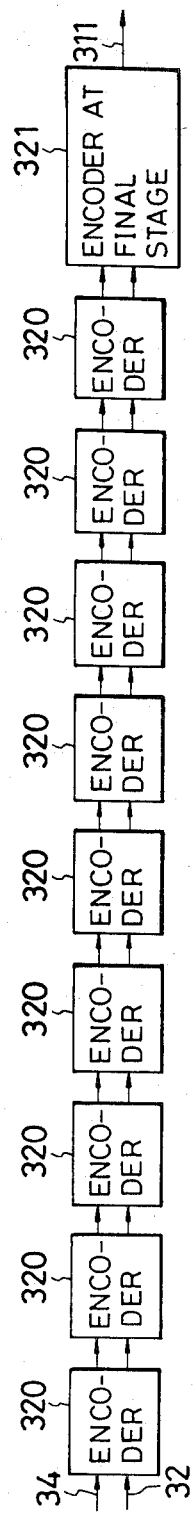
FIG.12 PRIOR ART
FIG.13 PRIOR ART

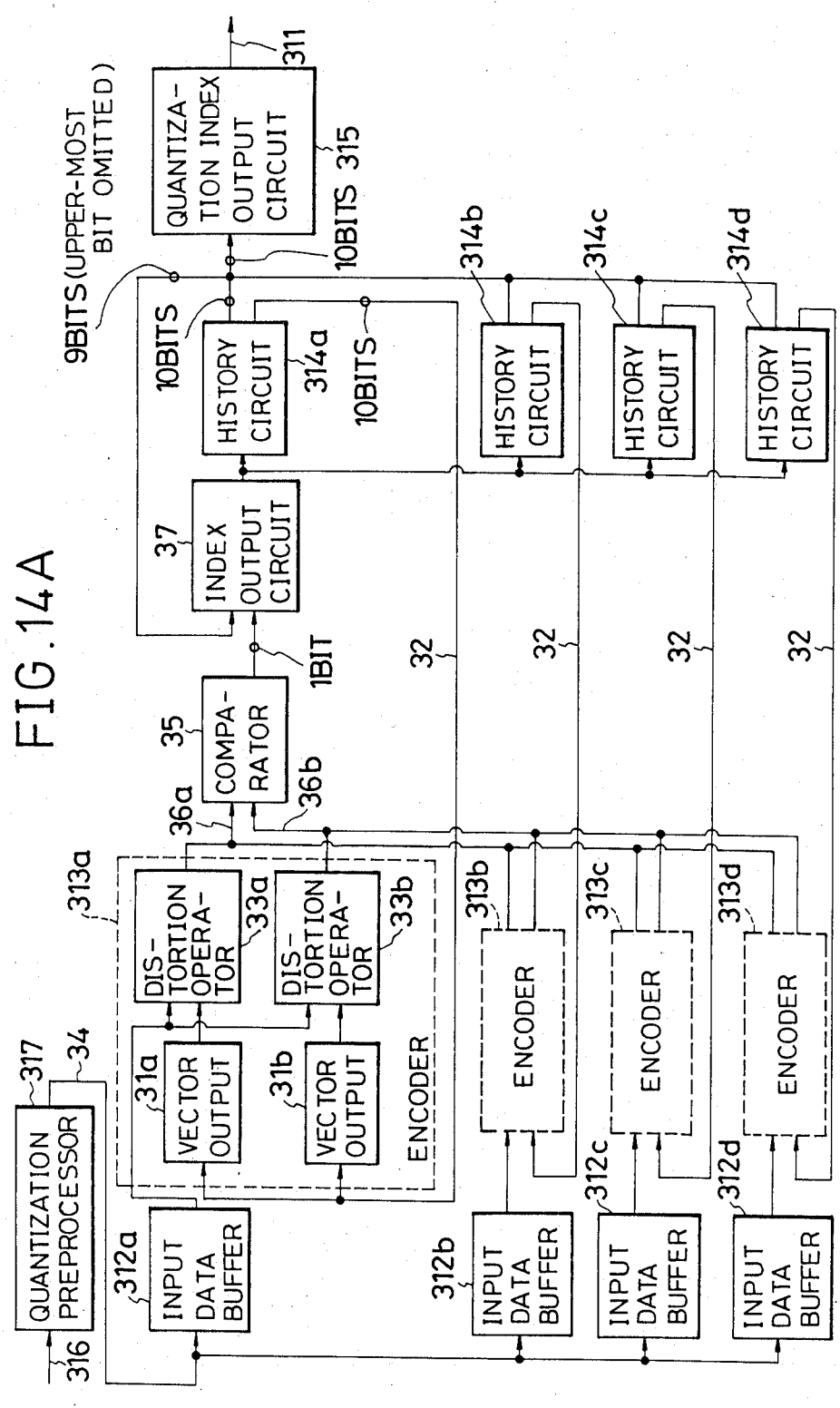

|     |     | MSB ———————— LSB |     |
| --- | --- | --- | --- |
| (a) | 1st | `0 0 0 0 0 0 0 0 1` |     |
| (b) | 2nd | `0 0 0 0 0 0 0 1 a` |     |
| (c) | 3rd | `0 0 0 0 0 0 1 a b` |     |
| (d) | 4th | `0 0 0 0 0 1 a b c` |     |
| (e) | 9th | `0 1 a b c d e f g h` | a,b,c,.....j = '0' OR '1' |
| (f) | 10th | `1 a b c d e f g h i` |     |
| (g) | QUANTIZATION OUTPUT INDEX | `a b c d e f g h i j` |     |

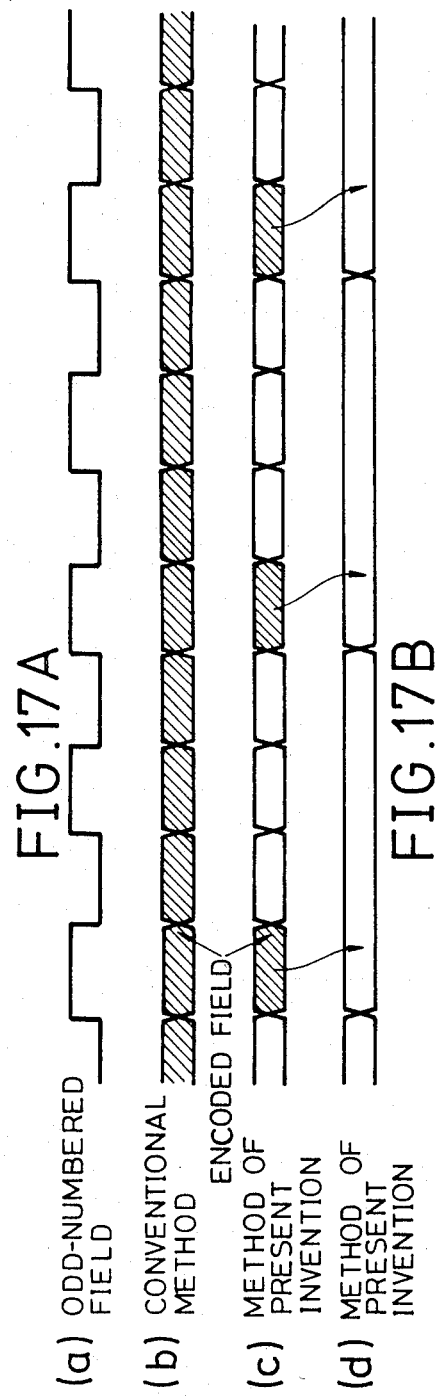

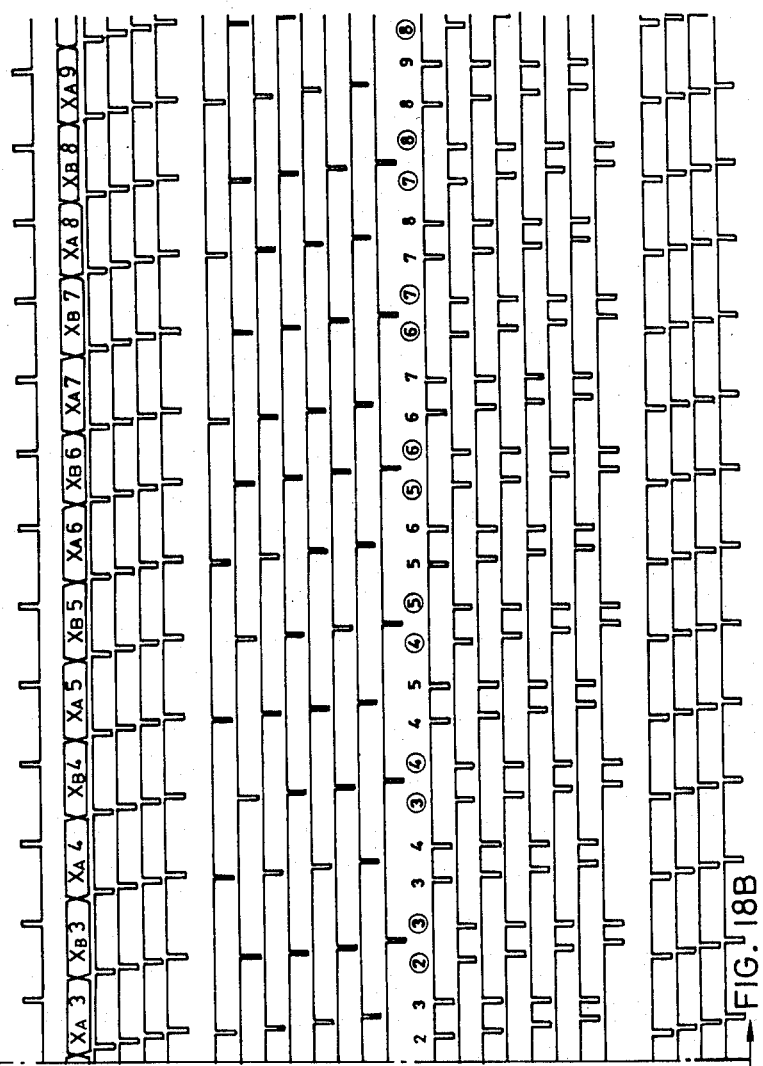

EXAMPLE OF MAP DATA

| No. | DISTANCE |
|---|---|
| 1 | 0 |
| 2......5 | 1 |
| 6......12 | 2 |

SYMBLE OF 1*-13* IS POSITION OF CENTRAL PIXEL OF REFERENCE BLOCK

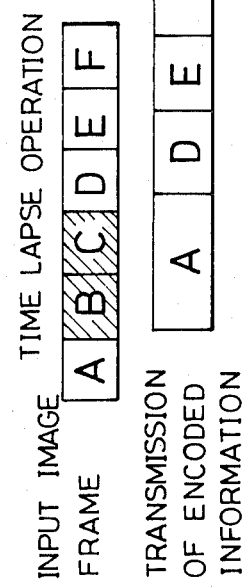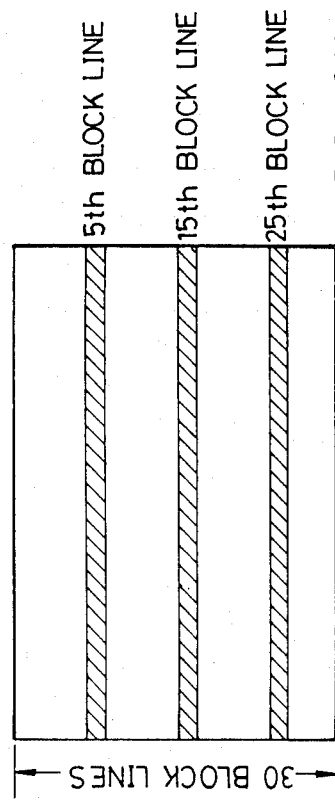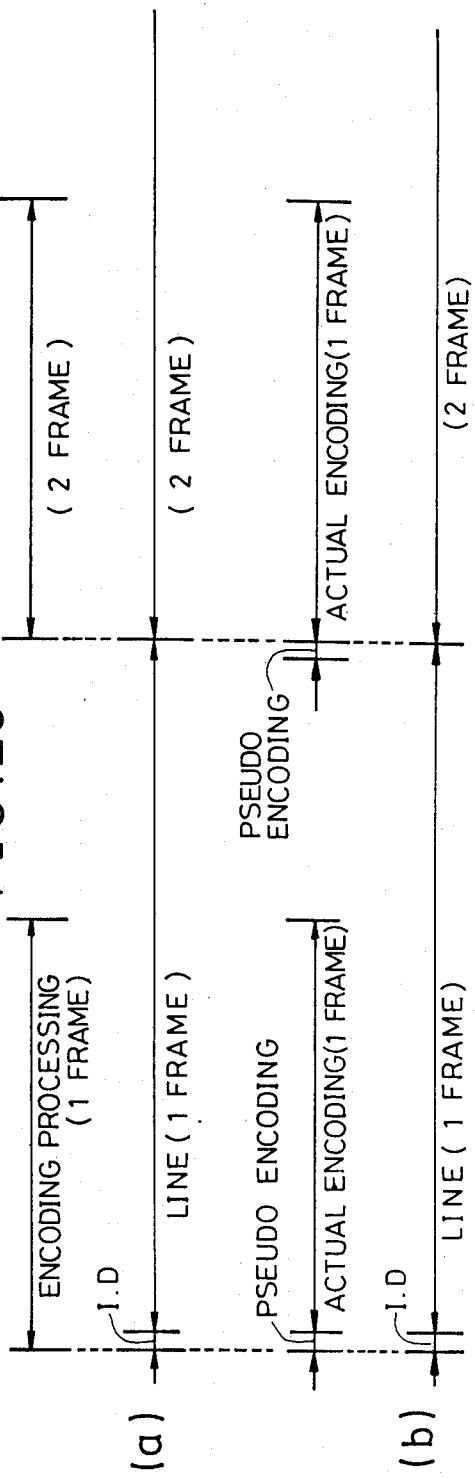

METHOD AND APPARATUS FOR ENCODING TRANSMITTING AND RECEIVING IMAGE BY PULSE CODE MODULATION

BACKGROUND OF THE INVENTION

1. Field of the Invention

The present invention relates to a technology for transmitting image signals obtained by encoding image information which utilizes the so-called vector quantization technique and which is applicable to the fields such as the television (TV) conference system and the TV telephone system.

2. Description of the Prior Art

As a result of the remarkable advance of the image processing technology in recent years, there have been made various attempts to put, for example, the TV conference system and the TV telephone system to the practical use by mutually and bidirectionally transmitting the image information. In such a technological field, the quantization technique has been used in which the image signals as the analog quantity are classified into a finite number of levels changing in a discrete fashion within a fixed width and a unique value is assigned to each of these levels. Particularly, there has been a considerable advance in the vector quantization technique in which a plurality of samples of the image signals are grouped in blocks and each block thereof is mapped onto a pattern most similar thereto in a multidimensional signal space; thereby accomplishing the quantization.

The study of the vector quantization technology has been described in the following reference materials, for example.

(1) "An Algorithm for Vector Quantizer Design" by Y. Linde, A. Buzo, and R. M. Gray (IEEE TRANSACTION ON COMMUNICATIONS, Vol. COM. 28, No. 1, Jan. 1980, pp. 84–95)

(2) "On the Structure of Vector Quantizers" by A. Gersho (IEEE TRANSACTION ON INFORMATION THEORY, Vol. IT28, No. 2, Mar. 1982, pp. 157–166)

(3) "Speech Coding Based Upon Vector Quantization" by A. Buzo, A. H. Gray Jr., R. M. Gray and J. D. Markel (IEEE TRANSACTION ON ACOUSTICS, SPEECH, AND SIGNAL PROCESSING, Vol. ASSP28, No. 5, Oct. 1980, pp. 562–574)

Moreover, the following U.S. Patents have been obtained by the assignee of the present invention.

(4) U.S. Pat. No. 4,558,350 "VECTOR QUANTIZER", Murakami (5) U.S. Pat. No. 4,560,977 "VECTOR QUANTIZER", Murakami et al.

An image encoding apparatuses to which the vector quantization technology described in the reference materials above is applied include the following device.

(6) U.S. application Ser. No. 819,067 "VIDEO ENCODING APPARATUS", Kubo et al, filed on Jan. 15, 1986.

Referring now to FIGS. 1–3B, the prior art technology of the present invention will be described. The conventional image encoding/transmitting apparatus, as shown in FIG. 1, includes a subtractor 1 for obtaining a difference between an input signal $S_1$ such as an image signal and an estimation signal $S_9$ and for outputting an estimated error signal $S_2$, a movement detecting circuit 2 for comparing a threshold value T with the estimated error signal $S_2$ to detect a movement or a change and for generating and outputting a movement or change detect signal $S_3$ and a differential signal $S_4$, a quantization circuit 3 for quantizing the movement or change detect signal $S_3$ and the differential signal $S_4$ to output a quantization signal $S_5$, a variable length encoder 4 for generating from the quantization signal $S_5$ an encoded signal $S_6$ with a variable length and for outputting the encoded signal $S_6$, a transmission data buffer circuit 5 for temporarily storing the encoded signal $S_6$ and for outputting the encoded signal $S_6$ to the transmission side, a local decoding circuit 6 for generating a reproduced differential signal $S_7$ from the quantization signal $S_5$ delivered from the quantization circuit 3 and outputting the reproduced or regenerated differential signal $S_7$, an adder 7 for achieving an addition on the reproduced differential signal $S_7$ and the estimation signal $S_9$ and for outputting a reproduced input signal $S_8$, an estimating circuit 8 for outputting an estimation signal $S_9$ based on the reproduced input signal $S_8$, and a threshold generating circuit 9 for monitoring the amount of the encoded signal $S_6$ accumulated in the transmission data buffer circuit 5 and for generating an appropriate threshold value T.

The movement detecting circuit 2 comprises, as shown in FIG. 2, an absolute value circuit 10 for calculating the absolute value $|S_2|$ of the estimated error signal $S_2$, a comparing circuit 11 for effecting a comparison between the absolute value $|S_2|$ of the estimated error signal $S_2$ and the threshold value T and for outputting the movement or change detect signal $S_3$, and a zero allocator 12 for allotting 0 and outputting 0 as the differential signal $S_4$ when the movement or change is not detected as a result of the comparison in the comparing circuit 11. The movement detect signal $S_3$ is converted into a running record R by use of the running length encode table 4a to generate serial data. In addition, only when the movement detect signal $S_3$ is indicating the validness, the quantization signal $S_5$ is converted into a variable-length record through the variable-length encoding table 4b to generate serial data (FIGS. 2B–2C). Reference numeral 4c indicates a multiplex operation control section.

In contrast to the configuration on the transmission side of FIGS. 1–2B, the configuration on the reception side is shown in FIGS. 3A–3B. In FIG. 3A, the equipment on the reception side includes a receiving data buffer circuit 13 for receiving and for temporarily storing the encoded signal $S_6$ delivered from the transmission data buffer circuit 5 on the transmission side, a variable length decoder 14 for decoding the encoded signal $S_6$ stored in the receiving data buffer 13 to output a reproduced quantization signal $S_{11}$, a local decoding circuit 15 for outputting a reproduced differential signal $S_{12}$ based on the reproduced quantization signal $S_{11}$, an adder circuit 16 for obtaining the sum of the reproduced differential signal $S_{12}$ and the reproduced estimation signal $S_{13}$ and for reproducing the input signal $S_{14}$ which corresponds to the reproduced input signal $S_8$ on the transmission side, and an estimating circuit 17 for outputting the reproduced estimation signal $S_{13}$.

After the encoded signal $S_6$ has undergone the multiplexing in the variable-length encode circuit 4 is received by the receiving buffer circuit 13, the data is distributed to the respective decode tables of variable codes under control of the multiplex separation control circuit 14a. As a result of the decoding, the movement detect signal and the quantization signal are attained. Moreover, when the decoded movement detect signal indicates the invalidness (="0"), the quantization signal is reset to "∅" by the flip-flop 14e, thereby outputting the output $S_{11}$ (FIG. 3B).

Next, the operation on the transmission side will be described with reference to FIGS. 1–2.

Assuming first the non-effective error in the movement detecting circuit 2 to be d, the estimation coefficient to be applied to the reproduced input signal $S_8$ in the estimating circuit 8 to be A, and the delay of the time t to be $Z^{-t}$, the following relationships are satisfied.

$$S_2 = S_1 - S_9$$

$$S_4 = S_2 + d$$

$$S_7 = S_4 + Q$$

$$S_8 = S_7 + S_9 = S_1 + Q + d$$

$$S_9 = A \cdot S_8 \cdot Z^{-t}$$

The subtractor 1 calculates the estimated error signal $S_2$ representing the difference between the input signal $S_1$ and the estimated signal $S_9$, whereas the movement detecting circuit 2 outputs the movement or change detection signal $S_3$ and the differential signal $S_4$ based on the estimated error signal $S_2$ calculated by the subtractor 1.

A detailed description will be given of the operation of the movement detecting circuit 2 by referring to FIG. 2. The allotting absolute value circuit 10 obtains the absolute value of the estimated error signal $S_2$ and then the comparison circuit 11 achieves a comparison between the absolute value $|S_2|$ of the estimated error signal $S_2$ and the threshold value T generated by the threshold value generating circuit 9.

The movement detection signal $S_3$ is output in conformity with the following conditions.

$$S_3 = 0 \text{ (invalid)}, |S_2| < T$$

$$S_3 = 1 \text{ (valid)}, |S_2| \geq T$$

When the movement or change is not detected, namely, for "$S_3 = 0$", zero allocator 12 outputs "0" for the differential signal $S_4$.

On the other hand, the quantization circuit 3 converts the inputted differential signal $S_4$ according to an arbitrary characteristic. The variable encoding circuit 4 receives the quantization signal $S_5$ only when the movement detection signal $S_3$ is valid, namely, for "$S_3 = 1$" and, for example, conducts a run-length encoding on the movement detection signal $S_3$. For the quantization signal $S_5$, a code having a smaller code length is assigned to a value in the neighborhood of "0" for which the generation frequency is high and then the code is stored in the transmission data buffer circuit 5. The transmission data buffer circuit 5 outputs the accumulated datum as the encoded signal $S_6$ to a transmission line. The threshold generating circuit 9 monitors the accumulated amount of the transmission data buffer circuit 5 and further controls the generation amount of the encoded data by generating an appropriate threshold value.

Next, the operation on the reception side will be described with reference to FIG. 3. The receiving data buffer circuit 13 first receives the encoded signal $S_6$ which has undergone the variable length encoding on the transmission signal and outputs the signal $S_6$ to the variable length decoder 14. Only when the movement detection signal $S_3$ having undergone the decoding operation indicates the validness, the variable length decoder 14 outputs the reproduced quantization signal $S_{11}$. If the movement detection signal $S_3$ indicates the invalidness, the variable length decoder 14 outputs "0". Next, the local decoding circuit 15 decodes the reproduced quantization signal $S_{11}$ and outputs the reproduced differential signal $S_{12}$ to the adder 16. The adder 16 adds the reproduced differential signal $S_{12}$ to the reproduced estimation signal $S_{13}$ from the estimation circuit 17 thereby to reproduce the input signal $S_{14}$.

The operation to effect the data compression and transmission by use of the differential signal is referred to as the differential pulse code modulation (to be abbreviated as DPCM herebelow) system.

However, in the image encoding/transmitting apparatus using the DPCM system, the variable length encoding is achieved on the datum which is judged to be effective at the step of the variable length encoding; consequently, as the threshold value increases, the code having a short code length to be assigned in the neighborhood of "0" cannot be generated and hence the efficiency of the encoding is deteriorated; moreover, there has been a problem that as the threshold value becomes greater, the precision of the quantization is not improved for the quantization characteristic of the quantization circuit in the circuitry on the transmission side even when the dynamic range of the effective datum is narrowed.

SUMMARY OF THE INVENTION

It is therefore the first object of the present invention to provide an image encoding/transmitting apparatus and a method thereof using the DPCM system having a high encoding efficiency for generating a code with a short code length regardless of the magnitude of the threshold value.

It is the second object of the present invention to provide an image encoding/transmitting apparatus and a method thereof using the DPCM system having a high encoding efficiency in which the quantization error is minimized by use of the quantization characteristic corresponding to the threshold value.

It is the third object of the present invention to provide an image encoding/transmitting apparatus and a method thereof in which input vectors of a plurality of pixel (Pixel means picture element.) signals can be simultaneously subjected a quantization processing and single circuit achieves a function equivalent to that of a plurality of stages of circuits for the same input vector, thereby miniaturizing the circuit.

It is the fourth object of the present invention to provide an image encoding/transmitting apparatus and a method thereof in which a correction can be accomplished in a case where a mismatching is detected for a block selected by the movement compensation.

It is the fifth object of the present invention to provide an image encoding/transmitting apparatus and a method thereof in which a control can be effected according to an appropriate encoding control parameter.

To accomplish these objects, the image encoding/-transmitting apparatus and method of the present invention are configured as follows.

Namely, first, to achieve the first object, according to the image encoding/transmitting apparatus and method of the present invention, the polarity of the differential signal $S_4$ is judged, a polarity is assigned to the threshold value T based on the judgement, the differential signal $S_4$ is corrected based on the threshold $T_1$ to which the polarity is thus assigned, and the corrected differential signal $S_{15}$ is quantized and subjected to the DPCM transmission and reception.

Secondly, to achieve the second object according to the apparatus and method of the present invention, a plurality of characteristics are prepared for the quantization only in the valid datum range of the difference signal in association with the change in the threshold value, so that the quantization is effected through a change-over operation conducted by selecting a quantization characteristic according to the change in the threshold value.

Thirdly, to achieve the third object according to the apparatus and method of the present invention, a quantization preprocessing circuit is provided and an n-dimensional input vector associated with each pixel signal obtained by the thinning out operation of the preprocessing circuit is respectively stored in each buffer. Each input vector is fed to an encoding section disposed corresponding to each buffer, so that the vector distortion is concurrently calculated in the respective encoding sections at the same time and the calculated distortion values are sequentially output for each period of the quantization processing of each pixel signal, thereby generating the quantizer output index.

Fourthly, to achieve the fourth object according to the apparatus and method of the present invention, paying attention to a fact that there exists a high possibility of the mismatching when the input block is far away from a selection block obtained as a result of the movement compensation, when the distance between the input and selection block is found to be great as a result of a distance calculation, a control is achieved by use of an auxiliary threshold value which causes the threshold value to be minimized.

Finally, to achieve the fifth object according to the apparatus and method of the present invention, there is provided a frame memory to implement an encoding control parameter auxiliary control step in which a portion of the digital input signal stored in this memory is extracted, a pseudo encoding is conducted on the extracted digital signal and the encoding control parameter calculated based on the encoding signal amount of the previous frame is corrected depending on the encoded digital signal obtained by the pseudo encoding so as to obtain the parameter which approximates the optimum value.

BRIEF DESCRIPTION OF THE DRAWINGS

The present invention will be apparent from the following detailed description taken in conjunction with the accompanying drawings in which:

FIG. 5A is a schematic block diagram illustrating the details of the threshold compensation circuit of FIG. 4A, FIG. 5B is a block diagram illustrating in detail the polarity judgment circuit 19 of FIG. 5A, FIG. 5C is a block diagram showing in detail the polarity adder circuit of FIG. 5A;

FIG. 6A is a block configuration diagram showing the construction of the apparatus on the reception side according to the first embodiment of FIG. 4A, FIG. 6B is a block diagram showing the configuration of the variable-length decoder as an apparatus on the reception side;

FIG. 7A is a schematic block diagram depicting the configuration of the threshold compensation regeneration circuit of FIG. 6A, FIGS. 7B-7C are a table of threshold values with polarity and the characteristic diagram, respectively for explaining the operation of the threshold compensation regenerator circuit;

FIG. 8A is a block configuration circuit illustrating the transmission circuit section of a second embodiment of the image encoding/transmitting apparatus using the DPCM system according to the present invention, FIG. 8B is a block circuit showing in detail the threshold value generating circuit 9 of FIG. 8A, FIG. 8C is a characteristic graph depicting a conversion example;

FIG. 9A is a block configuration diagram showing the details of the adaptation quantization circuit of FIG. 8A, FIG. 9B is a block configuration diagram illustrating the details of the adaptation local decoding circuit of FIG. 8A, FIG. 9C is a block circuit diagram showing in detail the characteristic selecting circuit 28 of FIG. 9A, FIG. 9D is a block circuit diagram illustrating in detail the characteristic selecting circuit 29 of FIG. 9B;

FIG. 10 is a block configuration diagram illustrating the circuit section on the reception side in the transmission apparatus of the second embodiment of FIG. 8;

FIGS. 11(a)-11(b) are characteristic diagrams showing examples of the adaptive quantization and encoding characteristics according to the present invention;

FIG. 12 is a block configuration diagram depicting the encoding section in each stage of the general vector quantizer as a basis of a third embodiment of the present invention;

FIG. 13 is a schematic block diagram depicting the overall constitution of the vector quantizer of FIG. 12;

FIG. 14A is a schematic block diagram depicting the overall constitution of the vector quantizer in the image encoding/transmitting apparatus of the third embodiment associated with the vector quantizer of FIGS. 12-13 according to the present invention.

FIGS. 16(a)-16(g) are explanatory diagrams illustrating the indices in the third embodiment;

FIGS. 17A(a)-17A(d) are explanatory diagrams showing a state in which pixels are thinned out from the results of the subsampling on the image signals, FIGS. 17B(a)-17B(e) are explanatory diagrams showing a method for reading an input vector from each buffer.

FIGS. 18A and 18B are a timing charts illustrating output waveforms of the respective sections of the history circuit;

FIG. 24 is an explanatory diagram depicting an example of extraction of datum which has undergone the pseudo encoding;

FIG. 25(a) is a graph showing the encoding processing time associated with the image encoding/transmitting apparatus in the general example of FIG. 22;

FIG. 25(b) is a graph illustrating the processing time of the fifth embodiment; and FIG. 26 is an explanatory diagram showing the time-lapse control.

DETAILED DESCRIPTION OF THE PREFERRED EMBODIMENTS

A description will be now given of the embodiments suitable for the image encoding/transmitting apparatus according to the present invention.

Figure 4A:
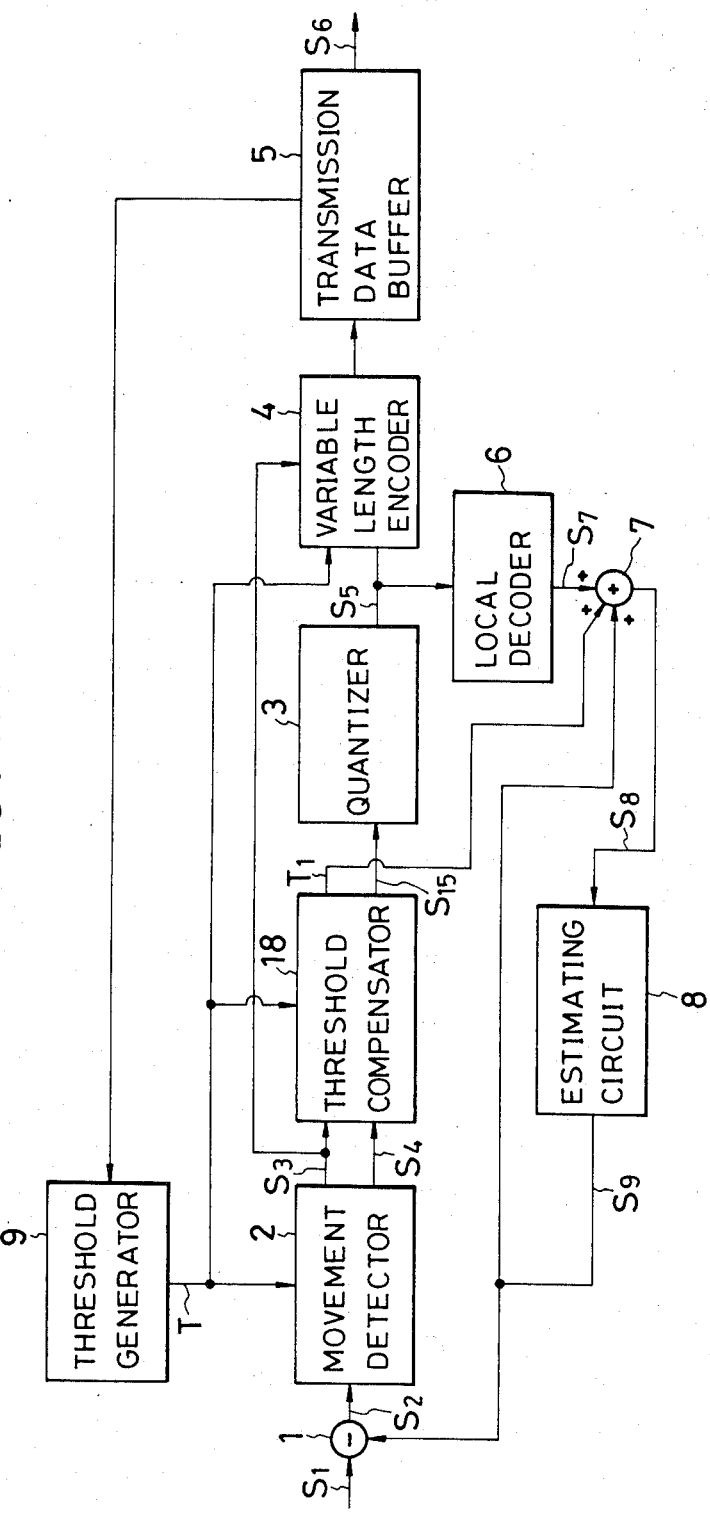
FIG. 4A is a block configuration diagram showing the configuration of the apparatus on the transmission side of the first embodiment of the image encoding/-transmitting apparatus using the DPCM system according to the present invention.

In FIG. 4A, reference numeral 18 indicates a threshold compensation circuit for assigning a polarity to the threshold value T output from the threshold generating circuit 9 according to the differential signal $S_4$ supplied from the movement detecting circuit 2, for generating the compensated differential signal $S_{15}$ by effecting a subtraction between the threshold value $T_1$ to which the polarity is assigned and the differential signal $S_4$, and for outputting the compensated differential signal $S_{15}$.

Figure 4B:
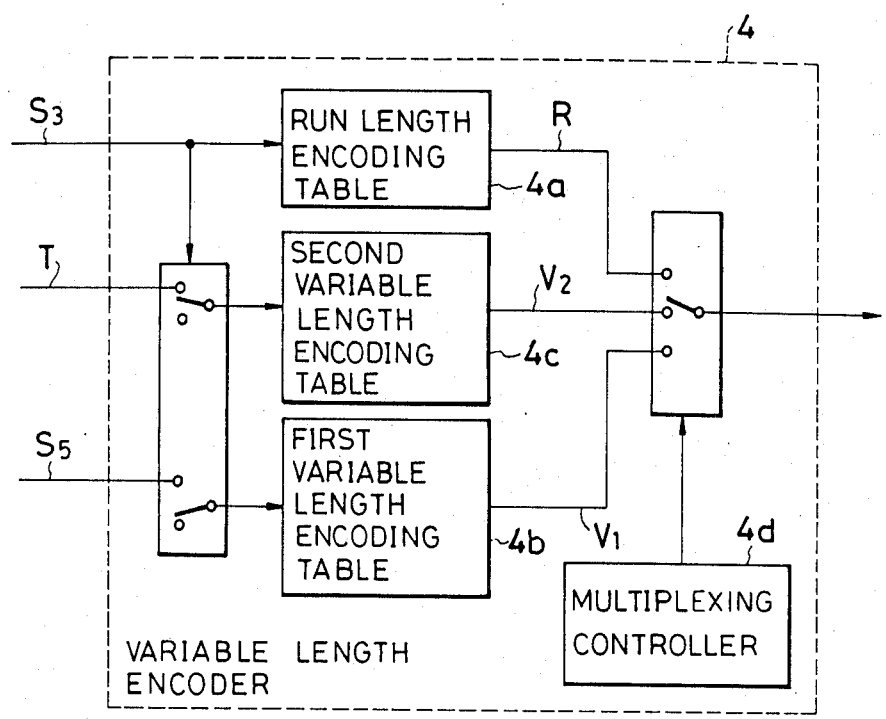
FIG. 4B is a block configuration diagram showing in detail the variable-length encode circuit 4.
Figure 4C:
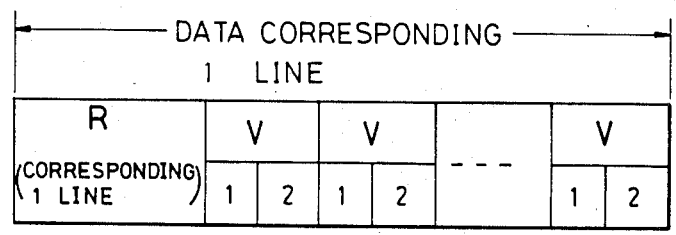
FIG. 4C is a schematic diagram illustrating an example of the encoding format of FIG. 4A.

As shown in FIG. 4B, the movement detect signal $S_3$ is converted into a run length code R by use of the run length encode table 4a to generate the serial data. Only when the movement detect signal $S_3$ is indicating validness, the threshold value T and the quantization signal $S_5$ are respectively converted into variable-length records by use of the variable-length encode tables 4b-4c; thereafter, the records are converted into serial data. The encode tables each are constituted from a storage device such as a ROM. Reference numeral 4d indicates a multiplexing control section. In this case, the multiplexing is accomplished as shown in FIG. 4C.

In FIG. 5A, reference numeral 19 denotes a polarity judgment circuit for judging the polarity of the difference signal $S_4$ and for outputting the polarity signal $S_{16}$, reference numeral 20 is a polarity adding circuit for assigning the polarity to the threshold value T output from the threshold generating circuit 9 according to the polarity signal $S_{16}$, and reference numeral 21 is a subtractor for achieving a subtraction between the threshold value $T_1$ with the polarity and the differential signal $S_4$ and for outputting the compensated differential signal $S_{15}$. The polarity judgment circuit 19 includes a comparator 19a as shown in FIG. 5B. Moreover, the subtractor 20 comprises a flip-flop 20a of FIG. 5C. In FIG. 5B, the following condition is satisfied.

if $A < B$ (="0") then $S_{16}$="1"

else $S_{16}$="0"

In FIG. 5C, the polarity signal $S_{16}$ is used as the sign bit of the threshold value T so as to be fetched by the FF. This FF is reset to "0" when the movement detect signal $S_3$ indicates the invalidness (="0").

In FIG. 6A, reference numeral 22 denotes a threshold compensation regeneration circuit for generating the regenerated differential signal $S_{21}$ from the detection signal $S_{17}$ output from the variable length decoding circuit 14, the threshold value T, and the regenerated, compensated difference signal $S_{20}$ output from the local decoding circuit 15 and for outputting the regenerated differential signal $S_{21}$. The variable length decoding threshold circuit 14, as shown in FIG. 6B, receives by means of the receive buffer circuit 13 the encoded signal $S_6$ which has undergone multiplexing in the variable-length encode circuit 4 on the transmission side, distributes the data to the respective decode tables of the variable-length code under control of the multiplexing separation control circuit 14d, and obtains as a result of the variable-length decoding operation the movement detect signal $S_{17}$, the threshold value T, and the quantization signal $S_{19}$. When the movement detect signal indicates invalidness, the threshold value T and the quantization signal $S_{19}$ are not delivered. Incidentally, the decode tables each are constituted from a memory device such as a ROM.

In addition, in FIG. 7A, reference numeral 23 is a polarity judgment circuit for judging the polarity of the regenerated, compensated differential signal $S_{20}$ and for outputting the polarity signal $S_{23}$, reference numeral 24 designates a polarity adding circuit for assigning the polarity to the threshold value T according to the polarity signal $S_{23}$ and for outputting the threshold value $T_1$ with the polarity, and reference numeral 25 indicates an adder for outputting the regenerated differential signal $S_{21}$ by adding the threshold value $T_1$ with the polarity and the regenerated, compensated differential signal $S_{20}$.

Next, the operation on the transmission side of the present invention will be described with reference to FIGS. 4A-5C.

First, assuming the non-effective error in the movement detecting circuit 2 to be d, the estimation coefficient to be applied to the regenerated input signal $S_8$ in the estimating circuit 8 to be A, and the delay of the time t to be $Z^{-t}$, the following relationships are satisfied.

$$S_2 = S_1 - S_9$$

$$S_4 = S_2 + d$$

$$S_{15} = S_4 - T$$

$$S_7 = S_5 + Q$$

$$S_6 = S_9 + S_7 + T = S_1 + Q + d$$

$$S_9 = A \cdot S_8 \cdot Z^{-t}$$

The subtractor 1 here calculates the estimated error signal $S_2$ representing the difference between the input signal $S_1$ and the estimated signal $S_9$, whereas the movement detecting circuit 2 outputs the movement detection signal $S_3$ and the differential signal $S_4$ based on the estimated error signal $S_2$ calculated by the subtractor 1.

The operation of the movement detecting circuit 2 in this case is the same as that of the conventional system.

On the other hand, the threshold compensation circuit 18 outputs the threshold value $T_1$ with the polarity and the compensated differential signal $S_{15}$ based on the movement detection signal $S_3$ and the differential signal $S_4$.

The operation of the threshold compensation circuit 18 in this case will be described in detail with reference to FIG. 5.

In FIG. 5A, the polarity judgment circuit 19 judges the polarity of the differential signal $S_4$ and outputs the polarity signal $S_{16}$ to the polarity adding circuit 20. On receiving the polarity signal $S_{16}$, the polarity adding circuit 20 assigns the polarity to the threshold value T from the threshold generating circuit 9 and outputs the resultant signal as the threshold value $T_1$ with the polarity. However, in the case where the movement detection signal $S_3$ indicates invalidness, the threshold value $T_1$ with the polarity is set to 0. In this case, there exists also a method in which the 0 is judged in the polarity judgment circuit 19 and the polarity adding circuit 20 sets the threshold value $S_1$ with the polarity to 0 according to the judgment. By subtracting the threshold value $T_1$ with the polarity from the differential signal $S_4$ in the subtractor 21, the threshold value is compensated and hence the compensated differential signal $S_{15}$ is outputted. The compensated differential signal $S_{15}$ is converted into the quantization signal $S_5$ in the quantization circuit 3 and is delivered to the variable length encoding circuit 4 and the local decoding circuit 6. When the movement detection signal $S_3$ is valid, the variable encoding circuit 4 receives the quantization signal $S_5$ and the threshold value T, and for example, effects a run length encoding on the movement detection signal $S_3$. For the quantization signal $S_5$, the variable length encoding circuit 4 assigns a code with a short code length to a value in the vicinity of 0 for which the generation frequency is high and accumulates the code in the transmission data buffer circuit 5; thereby outputting the signal as the encoded signal $S_6$ to the transmission line. Moreover, in the threshold generating circuit 9, the accumulated amount of data in the transmission data buffer 5 is monitored so as to generate an appropriate threshold value T to control the generation amount of the encoded datum. On the other hand, the local decoding circuit 6 decodes the quantization signal $S_5$ into the regenerated, compensated differential signal $S_7$, which is then fed to the adder 7. The adder 7 adds the threshold value $T_1$, the estimated signal $S_9$, and the regenerated, compensated differential signal $S_7$ to obtain the regenerated input signal $S_8$. The estimating circuit 8 delays the regenerated input signal $S_8$ by a period of time t beforehand set, multiplies the signal by the coefficient A, and outputs the resultant signal as the estimated signal $S_9$. If the time t is set to the period of time of a frame when the input signal $S_1$ is an image signal, a frame-to-frame DPCM transmitting apparatus is implemented; whereas, if the time t is set to the period of time of a field, a field-to-field DPCM transmitting apparatus is materialized.

In addition, in the embodiment above, the same effect can be attained by reducing the threshold value for the transmission by means of a control in which the generation and update of the threshold value are conducted at an interval of an arbitrary period of time $T_a$.

Next, the operation on the reception side will be described with reference to FIGS. 6A-6B. The encoded signal $S_6$ undergone the variable length encoding on the transmission side is received by the receiving data buffer circuit 13. Only when the decoded movement detection signal $S_{17}$ is valid, the variable length decoding circuit 14 outputs the threshold value T and the regenerated quantization signal $S_{19}$. When the signal $S_{17}$ is invalid, 0 is outputted. The local decoding circuit 15 decodes the regenerated quantization signal $S_{19}$ into the regenerated, compensated differential signal $S_{20}$; furthermore, the regenerated differential signal $S_{21}$ is regenerated in the threshold compensation regeneration circuit 22. The operation will be described with reference to FIG. 7A. The polarity of the regenerated, compensated differential signal $S_{20}$ is judged by the polarity judgment circuit 23, the polarity is assigned to the threshold value T depending on the polarity signal $S_{23}$ representing the positive or negative polarity, and the resultant signal is delivered as the threshold value $T_1$ with the polarity. However, when the movement detection signal $S_{17}$ indicates invalidness, the threshold value $T_1$ with the polarity is set to 0. Moreover, the adder 25 adds the regenerated, compensated differential signal $S_{20}$ to the threshold value $T_1$ with the polarity, thereby attaining the regenerated differential signal $S_{21}$. The adder 16 adds the estimated signal $S_{22}$ from the estimating circuit 17 to the regenerated differential signal $S_{21}$ so as to regenerate a regenerated signal $S_6$. The signal $S_6$ corresponds to the objective input signal $S_1$ on the transmission side.

The operation of the threshold compensation circuit can be represented by numeric values as shown in FIG. 7B. This example shows a case of T=5. FIG. 7C is an input/output characteristic graph corresponding thereto. The broken lines indicate the conventional example, whereas the solid lines represent the characteristic of the present invention.

As described above, even if the invalid data period (−T−O−T) occurs due to the movement detect circuit, the invalid data period can be canceled by effecting the threshold value compensation according to the present invention, which enables an increase in the quantization precision as compared with the conventional apparatus.

As described above, according to the embodiment of the present invention, the polarity of the differential signal is judged, a polarity is assigned to the threshold value depending on the judgment, the compensation of the differential signal is achieved according to the threshold value to which the polarity is assigned, and the compensated differential signal which has undergone the quantization is used for the transmission and reception; consequently, the generation of the code with a short code length allocated in the neighborhood of 0 is suppressed and hence the efficiency of the communication is improved.

Next, the second embodiment of the present invention will be described.

The datum compressing/transmitting apparatus utilizing the differential pulse modulation system according to the second embodiment includes a transmission circuit section for effecting the data compression and transmission on the digital input signal by use of the differential pulse modulation and a reception circuit section associated with the transmission circuit section. FIG. 8A shows the block construction diagram of the transmission circuit section of the embodiment.

In the second embodiment, the quantization circuit 20 comprises an adaptive quantization circuit 3 having a plurality of quantization characteristics. The adaptive quantization circuit 3 selects a characteristic depending on the threshold value T, conducts an adaptive quantization on the differential signal $S_4$, and outputs the adapted quantization signal $S_5$.

The adaptive local decoding circuit 6 is disposed corresponding to the adaptive quantization circuit 6, decodes the adapted quantization signal $S_5$, and outputs the regenerated differential signal $S_7$. Incidentally, the same reference numerals are assigned to the same components as those of the prior art example and the description thereof will be omitted.

FIG. 9A is a block diagram for explaining the adaptive quantization circuit 3 in detail. The character selecting circuit 28 selects a quantization characteristic depending on the threshold value T and then quantizes the differential signal $S_4$.

FIG. 9B is a block diagram for explaining the adaptive local decoding circuit 6 in details. The character selecting circuit 29 selects a decoding characteristic depending on the threshold value T and then decodes the quantization signal $S_5$; furthermore, the obtained signal passes the zero allocation circuit 25 so as to be subjected to the zero allocation depending on the movement detection signal $S_3$.

Next, the flow of the signal will be described. As shown in FIG. 8A, assuming the digitalized input signal such as an image signal to be $S_1$, the estimated signal calculated by the estimating circuit 8 (to be described later) to be $S_9$, the estimation error signal to be $S_2$, the differential signal to be $S_4$, the regenerated differential signal to be $S_7$, and the regenerated input signal to be $S_8$, these exists the following relationships among the respective signal values.

$$S_2 = S_1 - S_9$$

$$S_4 = S_2 + d$$

$$S_7 = S_4 + Q$$

$$S_8 = S_9 + S_7 = S_1 + Q + d$$

$$S_9 = A \cdot S_8 \cdot Z^{-t}$$

where, d is the non-effective error in the movement detection circuit, Q stands for the quantization error, A indicates the estimation coefficient, and $Z^{-t}$ denotes a delay of the time t.

The estimating circuit 8 delays the regenerated input signal $S_8$ by a period of time t beforehand set, multiplies the obtained signal by the coefficient A, and outputs the estimation signal $S_9$.

Figure 1:
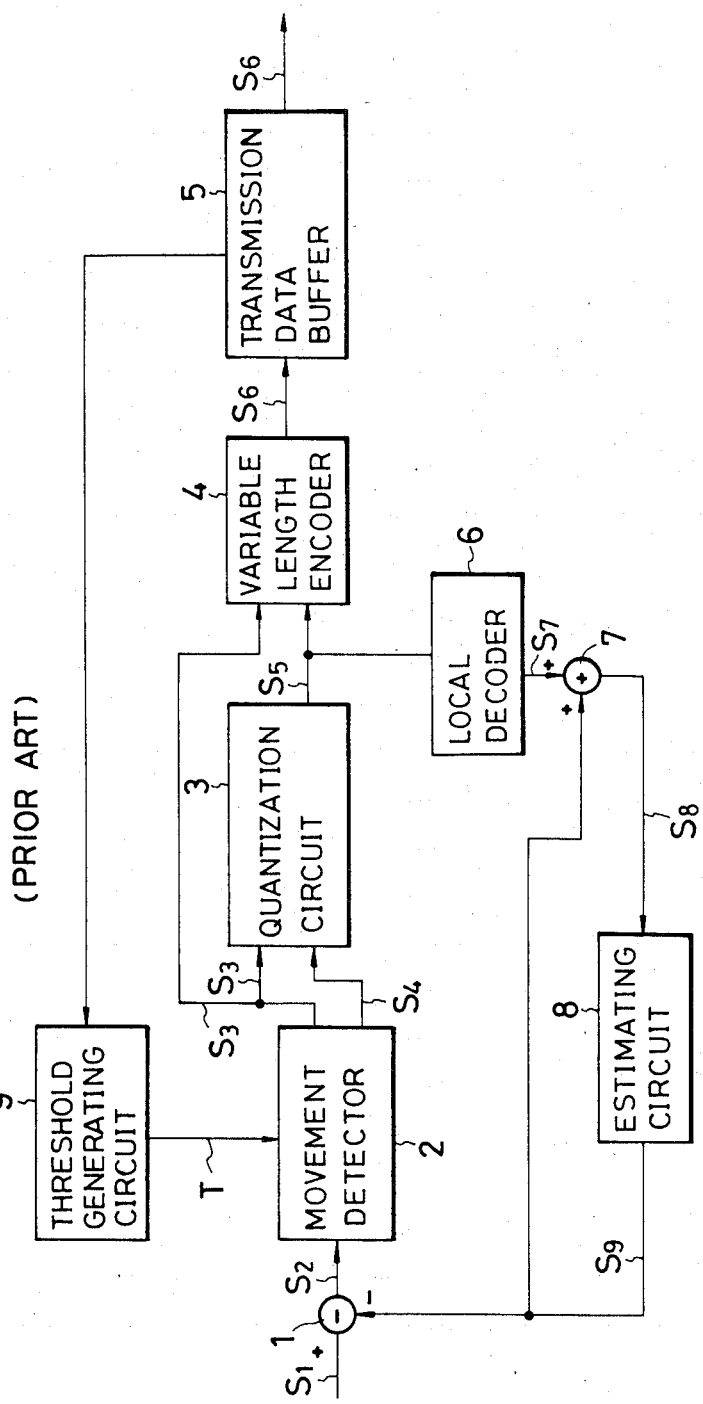
FIG. 1 is a block diagram showing the configuration on the transmission side of the prior art image encoding/transmitting apparatus utilizing the DPCM system.
Figure 2A:
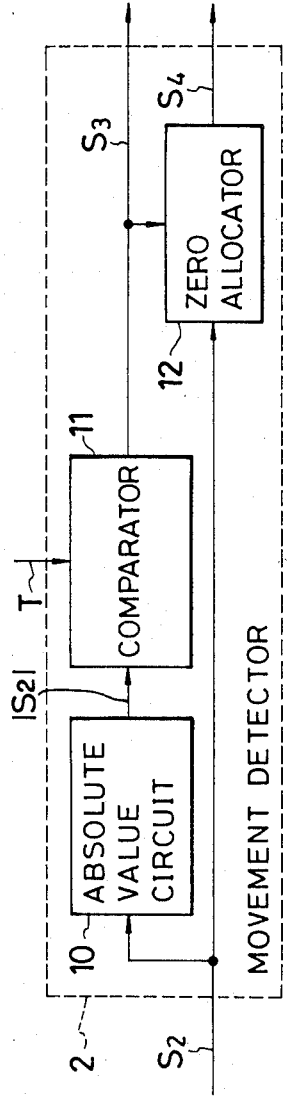
FIG. 2A is a block diagram illustrating a detailed configuration of the movement detecting circuit of FIG. 1.
Figure 2B:
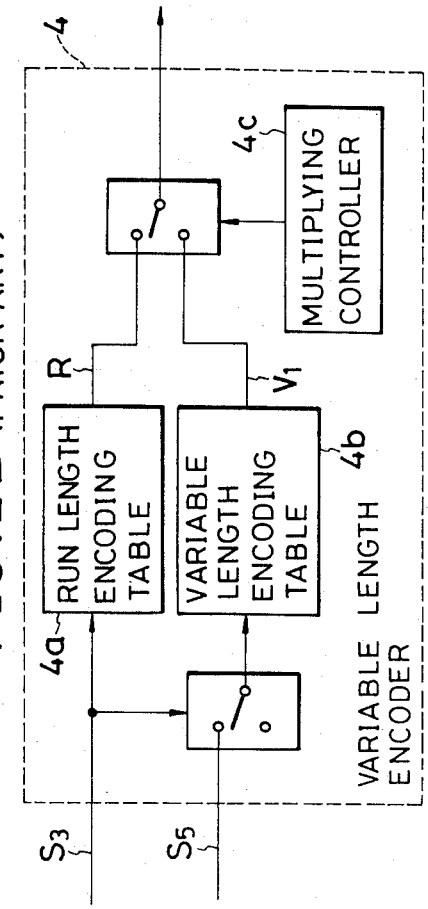
FIG. 2B is a block diagram illustrating a detailed configuration of the variable-length encode circuit 4.
Figure 2C:
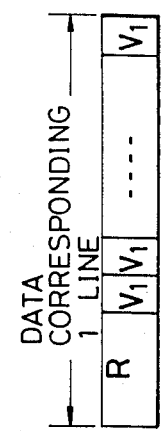
FIG. 2C is a schematic diagram illustrating an example of the multiplexing of the circuit of FIG. 1.
Figure 3A:
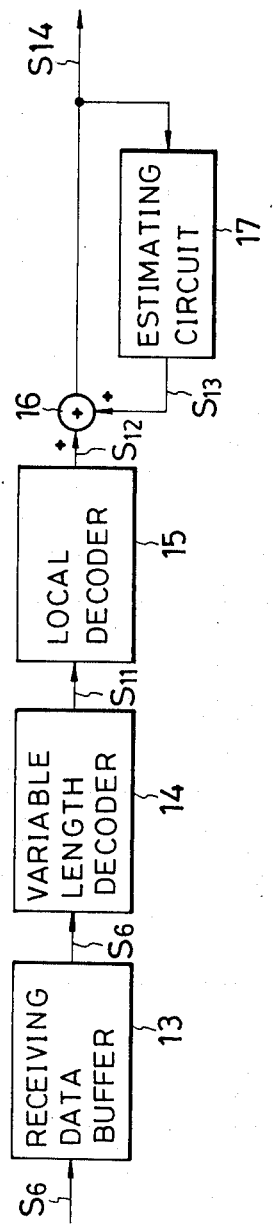
FIG. 3A is a block configuration diagram depicting the reception side of the prior art image encoding/transmitting apparatus.
Figure 3B:
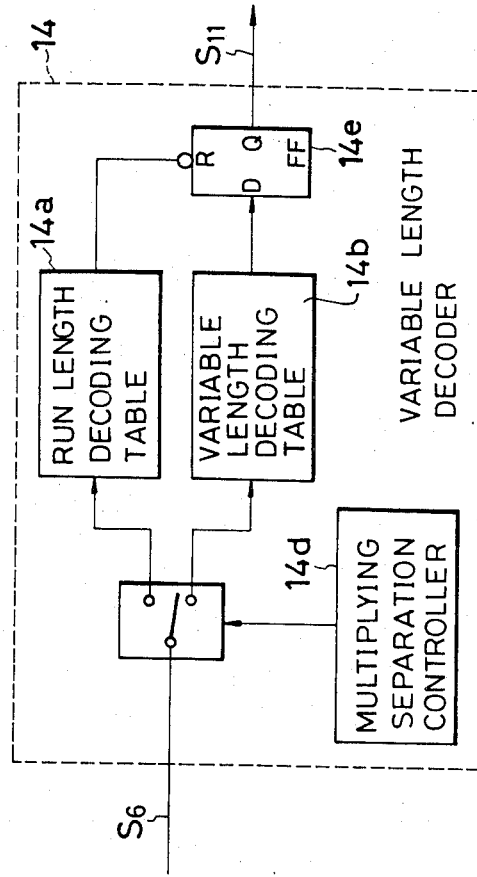
FIG. 3B is a block diagram showing the details of the variable-length decode circuit of FIG. 3A.

Like FIG. 2, in the movement detecting circuit 2, assuming the absolute value of the estimated error signal $S_2$ calculated by the absolute value circuit 10 to be $|S_2|$ and the threshold value to be T, the value of the movement detection signal V calculated by the comparing circuit 11 is determined as follows.

If $|S_2| < T$, then V=0 (valid)

else V=1 (valid).

Furthermore, if the predetermined amount of movement is not detected (within the invalid data range), the zero allocation circuit 12 allocates "0" to the estimated error signal $S_2$ and hence the differential signal $S_4$ is outputted as "0" to the adaptive quantization circuit 3.

As shown in FIG. 9A, the differential signal $S_4$ inputted to the adaptive quantization circuit 3 is converted into the quantization signal $S_5$ according to the quantization characteristic specified by the character selecting circuit 28 which changes over the characteristic depending on the threshold value T and the quantization signal Shad 5 is then outputted to the variable length encoding circuit 4.

A description will be here given of the quantization characteristic example in reference to FIG. 11(a).

The dot-and-dash line indicates a characteristic example in the case of T=0, whereas the solid line denotes a characteristic example in the case of T=3. As shown in this diagram, when the datum of the differential signal $S_4$ is in the invalid data range ($-T < $data$ < +T$), the quantization is not accomplished, namely, the quantization is effected only for the datum in the valid data range (data$< -T$ or $+T<$data). As can be seen from FIG. 9A, the quantization characteristic selected by the character selecting circuit 28 is such that the quantization output on the differential signal within the invalid data range (within the specified range of the corresponding threshold value) becomes "0", which improves the quantization accuracy.

The characteristic selecting circuit 28, as shown in detail in FIG. 9C, comprises a flip-flop 28a (FF) to which the decoded quantization signal selected by the characteristic selecting circuit 28 is delivered as an input signal and is reset to "0" when the movement detect signal $V_D$ indicates invalidness (V=0).

The variable length encoding circuit 4 receives only the quantization signal $S_5$ for which the movement detection signal $S_3$ is valid (V=1) and effects the run length encoding on the movement detection signal $S_3$. For the quantization signal $S_5$, a code with a short code length is assigned to the value in the neighborhood of 0 for which the generation frequency is high, and the resultant code is transmitted to the transmission data buffer circuit 5. The data accumulated in the transmission data buffer circuit 5 is sent as the encoded signal $S_6$ to the transmission path.

In addition, as shown in FIG. 8A, the quantization signal $S_5$ is also delivered to the adaptive local decoding circuit 6.

Moreover, as shown in FIG. 8B, the threshold value generator circuit 9 includes a conversion table 9a used to convert an input data into a threshold value based on the accumulated amount of the data. FIG. 8C shows the relationships between the accumulated data amount and the threshold value.

On the other hand, as shown in FIG. 9B, the adaptive decoding circuit 6 selects a decoding characteristic by means of the character selecting circuit 29 corresponding to the quantization characteristic selected by the adaptation quantization circuit 3. As shown here in FIG. 9D, the characteristic selecting circuit comprises a memory device such as a ROM and the selection signal thereof is determined by use of mapping in which the threshold value T is used as an address input. Moreover, the allocation zero circuit 25 allocates the invalid datum "0", which is then delivered as the regenerated differential signal $S_7$. FIG. 11B shows a decoding characteristic example. In the adder 7, the regenerated differential signal $S_7$ is added to the estimation signal $S_9$ to obtain the regenerated input signal $S_8$ to the supplied to the estimating circuit 8.

The threshold generating circuit 9 monitors the data accumulation amount of the transmission data buffer circuit 5, generates an appropriate threshold value according to the data accumulation amount, and thereby achieves a smoothing operation on the data code amount.

FIG. 10 is the block construction diagram illustrating the reception circuit section of the data compressing/transmitting apparatus utilizing the differential pulse modulation system according to the present invention. The reception data buffer circuit 13 temporarily stores the encoded signal $S_6$, the variable length decoding circuit 14 decodes the encoded signal $S_6$, the adaptive local decoding circuit 15 outputs the regenerated differential signal $S_{12}$, and the estimating circuit 17 estimates the regenerated signal $S_{14}$.

Here, the detailed constitution of the adaptive local decoder circuit 15 is the same as that of the circuit 6 of FIG. 8A. In addition, the quantization characteristic and the decoding characteristic associated with the memory device such as an ROM are the same as those shown in FIGS. 9A-9D.

The regenerated signal $S_{14}$ is calculated by the adder 16 from the estimated signal $S_{13}$ and the regenerated differential signal $S_{12}$.

Next, the flow of the signal in the reception circuit section will be described. The encoded signal $S_6$ subjected to the variable length encoding in the transmission circuit section is received by the receiving data buffer circuit 13 and is then transmitted to the variable length decoding circuit 14.

Only when the movement detection signal $S_{11c}$ decoded in the variable length decoding circuit 14 indicates the valid data range (V=1), the quantization signal $S_{11a}$ and the threshold value $S_{11b}$ are fed to the local decoding circuit 15. When the decoded movement detection signal $S_3$ indicates the invalid data range (V=0), "0" is delivered to the local decoding circuit 15.

Moreover, like the adaptive local decoding circuit 6 of the transmission circuit section, the adaptive local decoding circuit 15 selects a decoding characteristic depending on the threshold value $S_{11b}$. The quantization signal $S_{11a}$ is then decoded into the regenerated differential signal $S_{12}$ and is added by means of the adder to the estimated signal $S_{13}$ from the estimating circuit 17, thereby the encoded signal $S_6$ from the transmission circuit section is regenerated as a signal $S_{14}$.

In this embodiment, the same effect can be attained by reducing the threshold value for the transmission through an operation to generate (update) the threshold value at an interval of an arbitrary period of time T (e.g. a frame period).

Prior to the description of the third embodiment of the present invention, description will be given of the technology adopted as the basis of the third embodiment and of the outline thereof.

The third embodiment relates to a vector quantizer for encoding image signals with a high efficiency, and in particular, to a miniaturized vector quantizer. FIG. 12 shows the technology as the basis of the third embodiment. This diagram illustrates a block diagram of the n-th stage of the vector quantizer. As shown in FIG. 13, the vector quantizer includes a multi-stage connection of a plurality of stages.

In FIG. 12, reference numeral 31a and 31b are a vector output circuits, reference numeral 32 indicates an input index, reference numerals 33a-33b are distortion operating circuits, reference numeral 34 designates an input vector, reference numeral 35 indicates a comparator, reference numerals 36a-36b denote distortions, reference numeral 37 is an index output circuit, reference numeral 38 indicates a delay circuit, reference numeral 39 stands for an output vector, reference numeral 310 denotes an output index, and reference numeral 311 designates a quantizer output index. The encoding section 320 comprises the respective circuits above. Incidentally, reference numeral 321 in this diagram indicates the encoder at the final stage.

Next, the operation of this configuration will be described. When the input index 32 is received, the vector output circuits 31a-31b select output vectors from a group of output vectors beforehand prepared (code book) corresponding to the input index and then deliver the output vectors. The respective output vectors are supplied to the distortion computation circuits 33a-33b, which calculate the distortions (distances) with respect to the input vector sent from the input buffer 312. The distortions 36a-36b outputted as a result of the computation from the respective distortion computation circuits 33a-33b are fed to the comparator 35, which effects a comparison therebetween. For the distortion 36a< the distortion 36b, "0" is output; whereas for the distortion 36a≧the distortion 36b, "1" is output. Next, the distortion compare value is output together with the index 32 from the index output circuit 37 to the encoding section 320 of the next stage so as to be used to generate a new input index. The input vector 34 to be subjected to the distortion computation at the next stage is sent via the delay circuit 38 to the encoding section 320 of the subsequent stage, so that the distortion is computed with respect to the output vector selected and output by use of the new input index. The distortion computation is continuously repeated up to the encoding section 321 of the final stage so as to minimize the total of the distortion through a conversion, thereby generating the final quantizer output index 311.

In FIG. 13, the input vector and the input index to each encoding section 320 are respectively the output vector 39 and the output index 310 from an encoding section 320 of the previous stage. For the encoding section 321 at the final stage (the 10-th stage in this case), since there does not exist the encoding section 320 of the succeeding stage as compared with the encoding sections 320 of from the first to the ninth stages, the delay circuit 38 is not required. The output index from the final stage is delivered as the quantizer output index 311.

As shown in FIGS. 12-13, the prior art vector quantizer is configured such that the input vector (input datum) and the input index for selecting an output vector are sequentially transmitted to the next encoding section 320 while updating the input index in each encoding section 320 so as to generate the quantizer output index in the final encoding section 321, which consequently leads to problems that the size of the circuitry is increased and that the idle time or the wait time occurs in the encoding sections and hence the overall circuitry cannot be effectively utilized.

According to the vector quantizer of the embodiment, there is provided a quantization index output circuit in which the input image signal is subsampled in the quantization preprocessing circuit to thin out pixels, the respective pixel signals are used to form an n-dimensional input vector, and each input vector is stored in the input buffer corresponding to each pixel signal; furthermore, the input vector is supplied to the encoding section corresponding to the input buffer at an interval of the processing period. The encoding section calculates the distortion between the input vector and the output vector updated at an interval of the processing period. Based on the distortion, the input index generating means generates a new input index for selecting the output vector, and based on the input index, the quantizer output index rs generated and is output from a quantization index output circuit.

Figure 14B:
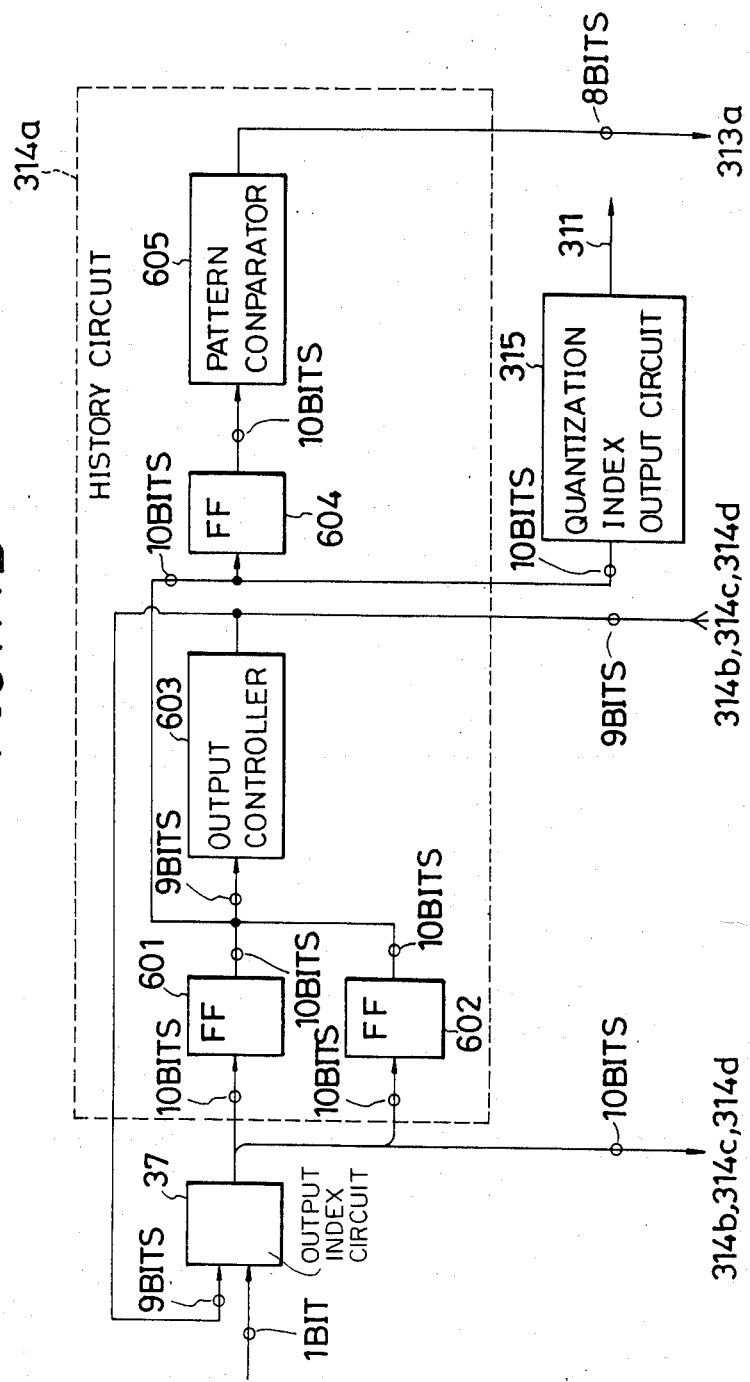
FIG. 14B is a block diagram illustrating in detail the history circuit 314 of FIG. 14A.
Figures 15, 16:
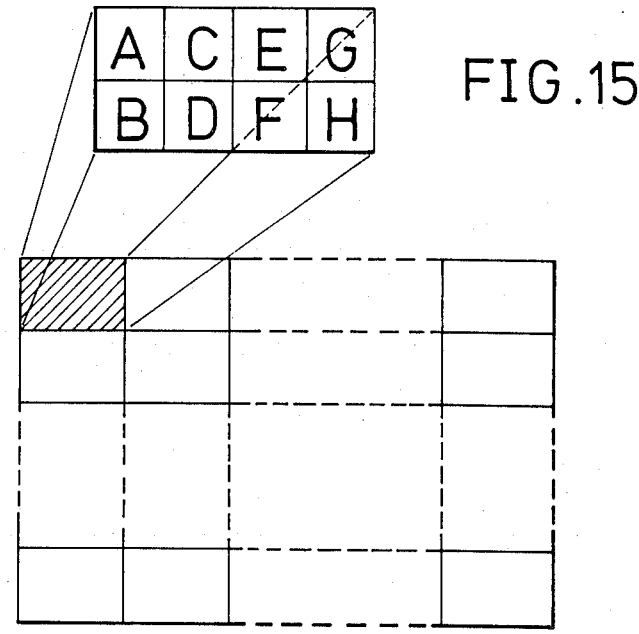
FIG. 15 is an explanatory diagram showing blocks of the vector quantizer of FIG. 14A.

Next, the third embodiment of the present invention will be described with reference to the drawings. FIG. 14A is a schematic block diagram depicting the entire configuration of the third embodiment in which reference numeral 316 denotes an input image, reference numeral 317 is an quantization preprocessing circuit, reference numerals 31a–31b designate vector output circuits for outputting vectors corresponding to the input index 32, reference numerals 33a–33b indicate distortion computation circuits for respectively calculating the distortion between the input vector 34 and the vectors delivered from the vector output circuits 31a–31b, reference numeral 35 denotes a comparator, reference numeral 36a stands for a distortion outputted from a circuit equivalent to the distortion computation circuit 33a in the encoding section 313a and the distortion computation circuit 33a in the respective encoding sections 313b, 313c, and 313d, reference numeral 36b designates a distortion outputted from a circuit equivalent to the distortion computation circuit 33b in the encoding section 313a and the distortion computation circuit 33b in the respective encoding sections 313b, 313c, and 313d, reference numeral 37 indicates an index output circuit, reference numeral 311 represents a quantizer output index of the vector quantizer, reference numerals 312a, 312b, 312c, and 312d are input buffers for storing the blocks A, B, . . . , H obtained by dividing the input vector 34 as shown in FIG. 15, reference numerals 313a, 313b, 313c, and 313d denote encoding sections, reference numerals 314a, 314b, 314c, and 314d indicate history circuits for outputting indices for the blocks of A, B, . . . , H, and reference numeral 315 denotes a quantization index output circuit for outputting the index of the vector quantizer circuit associated with the input vector. As shown in FIG. 14B, the history circuits 314a–314d each comprise a first flip-flop circuit 601 for receiving an output from the output index circuit 37, a second flip-flop circuit 602 for the same purpose, an output control circuit 603, a third flip-flop circuit 604 for receiving the respective outputs from the first and second flip-flop circuits 601-602, and a pattern comparing circuit 605 for delivering a history signal to the encoder 313a based on the output from the third flip-flop circuit 604. The pattern comparing circuit 605 is constituted, for example, from a code book. FIG. 15 shows a block attained by dividing the image of the third embodiment in which A-H indicate subblocks. The input buffers 312a–312d respectively store subblocks A-B, C-D, E-F, and G-H. The embodiment has been described with reference to a vector quantizer including ten stages. FIGS. 16(a)-16(g) show the indices and quantizer output index 311 to be output from the index output circuit 37 at each stage.

Figure 17C:
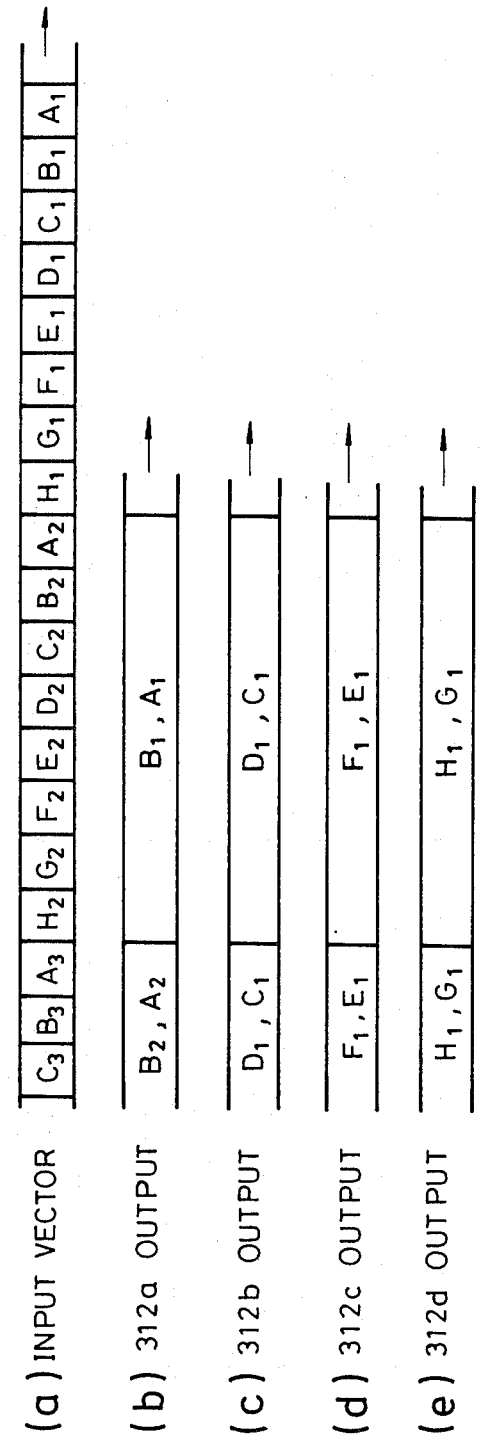
FIG. 17C is an explanatory diagram for explaining the details of the additional buffer.

Next, the operation of the embodiment will be described. The image 316 supplied to the system is thinned out in the quantization preprocessing circuit 317. (Refer to FIG. 17 for details.) Before the input vector 34 is supplied to the vector quantizer, the blocks A-B, C-D, E-F, and G-H of FIG. 15 are respectively written in the buffers 312a–312d. Thereafter, the image data is read as blocks of A-B, C-D, E-F, and G-H in parallel from the associated buffers 312a–312d, respectively, and the vector quantization is accomplished by executing the read operation ten times for each block. (Refer to FIG. 18 for details.) However, prior to the operation above, the vectors read from the buffers 312a, 312b, 312c, and 312d are respectively supplied to the distortion computation circuits 33a and 33b. The buffers 312a–312d are added to effect a concurrent processing by separating the input serial data into four data groups. The details of these buffers 312a–312d are shown in FIG. 17C.

Figure 18A:
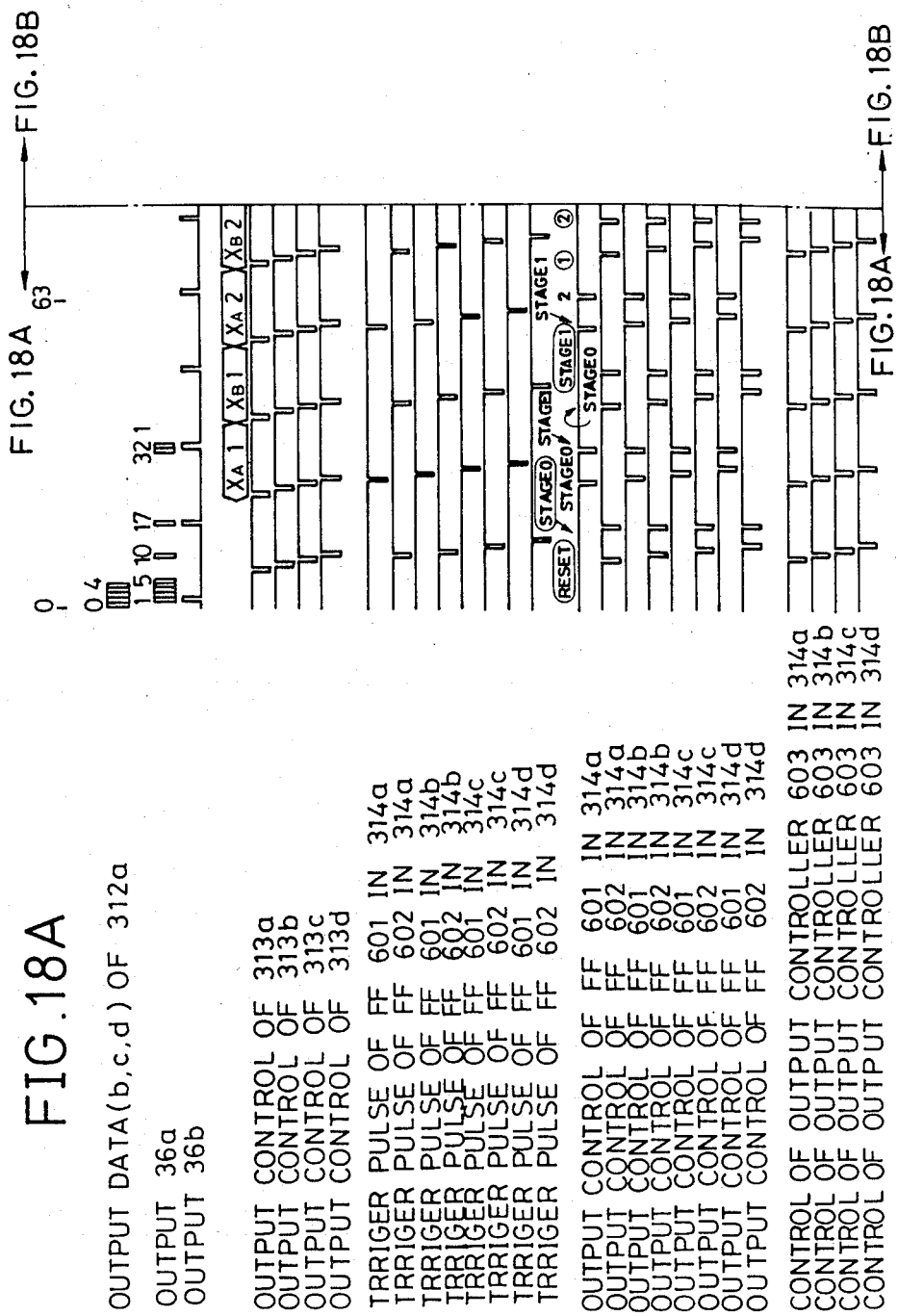

Furthermore, the vectors output from the vector output circuits 31a–31b according to the input index 32 are also delivered to the distortion computation circuits 33a–33b. The distortion computation circuits 33a–33b calculate the distortions between the vectors input from the input buffers 312a–312d and the vectors output from the vector output circuits 31a–31b, respectively. In this operation, to prevent the distortions from being delivered from the encoding sections 313a–313d to the comparator 35 at the same time, the distortions are output therefrom in the sequence of encoding sections as 313a, 313b, 313c, and 313d. Next, the distortions are input to the comparator 35 and "0" is output from the comparator if the distortion 36a is less than the distortion 36b; otherwise, "1" is output. Based on the output from the comparator 35 and the index previously supplied, the index circuit 37 outputs a new index. From the history circuits 314a–314d, the indices of the vectors of the respective blocks A-B, C-D, E-F, and G-H are output to the vector output circuit for the next distortion computation. In addition, the indices are also output to the index output circuit 37 to attain the next new index. This operation is repetitiously executed from the first stage to the tenth stage, and the index delivered from the last operation at the tenth stage is output as the vector quantizer index from the quantization index output circuit 315. The output waveforms at the respective sections described in conjunction with FIG. 14B of the history circuits 314a–314d are as shown in FIG. 18.

As described above, according to the third embodiment, the input image is subsampled, the pixels are subjected to the thinning-out operation, and the n-dimensional input vector to be shaped is minimized. Thereafter, for the input vectors of the same image, the distortion operation is repetitiously executed by the same distortion operation circuit to converge the total of the distortions, thereby minimizing the resultant value of the total. For other vectors, the distortions are concurrently calculated by the respective distortion operation circuits, and based on the distortions, the quantizer index is generated for each pixel signal; consequently, the size of the circuitry can be miniaturized and the entire circuitry can be efficiently operated without idle operations.

Prior to the description of the fourth embodiment of the present invention, description will be given of the technology adopted as the basis of the fourth embodiment.

Figure 19:
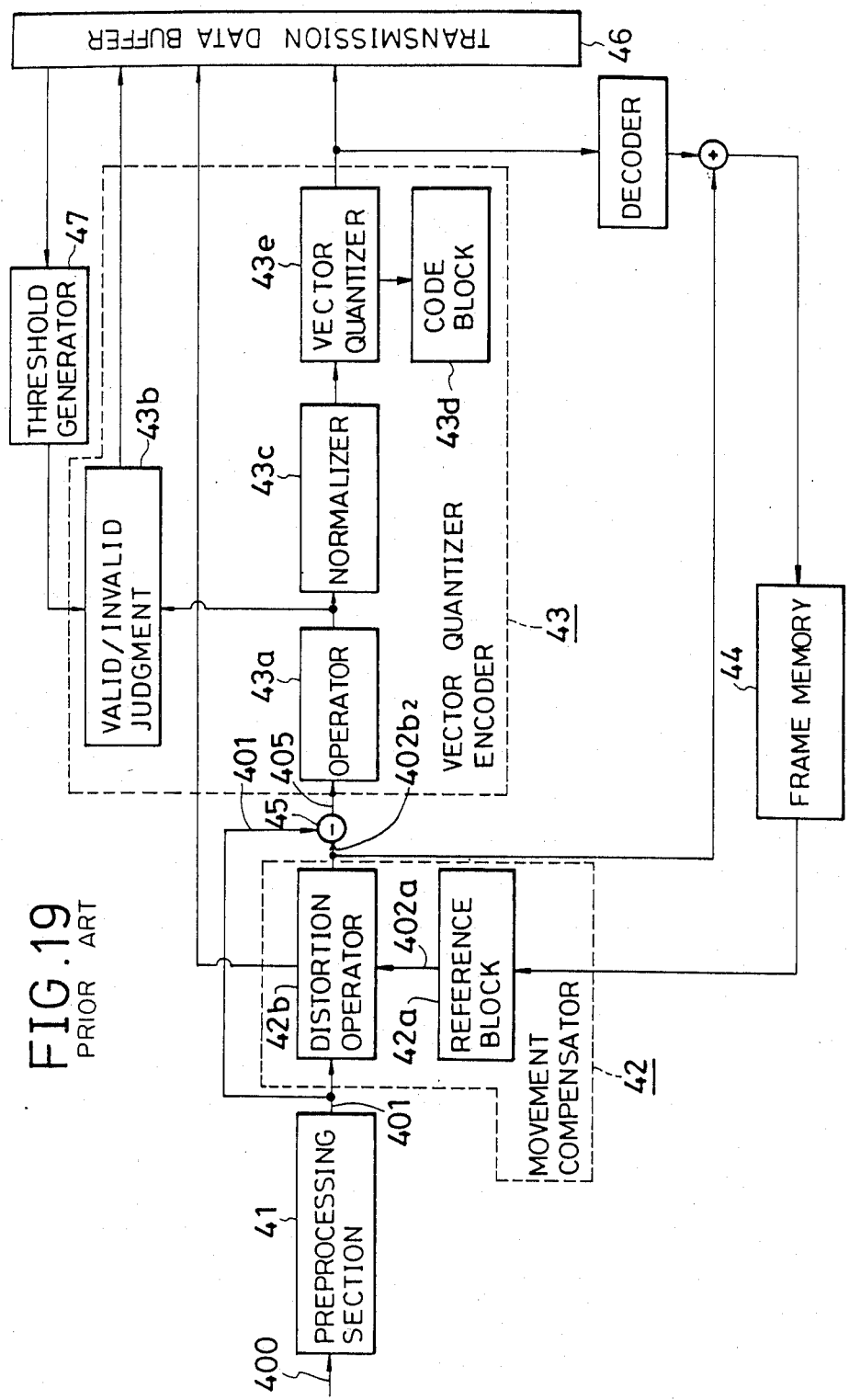
FIG. 19 is a block configuration diagram depicting a general example as a basis of a fourth embodiment of the image encoding/transmitting apparatus according to the present invention.

FIG. 19 shows an image encoding/transmitting apparatus to which the frame-to-frame encoding method utilizing the vectorizing method, namely, the image encoding/transmitting method as the basis of the fourth embodiment including the movement compensation is applied.

As shown in this diagram, the image encoding/transmitting apparatus primarily includes a preprocessing section 41, a movement compensation section 42, and a vector quantization section 43.

The preprocessing section 41 generates from the image input signal 400 blocks each containing k pixels existing in the neighborhood of each other in the image to form a k-dimensional vector signal 401 for each block, whereas the frame memory 44 is provided to store the image signal formed in a block in advance in time by a frame of the current image signal.

The movement compensation section 42 includes a reference block generating section 42a for generating as reference blocks a plurality of blocks each including the current vector signal 401, a block corresponding to the current vector signal 401, and a block stored in the frame memory corresponding to the same position in the image and for calculating the block position information $402_{a1}$ and the vector signal $402_{a2}$ and a distortion computation section 42b for calculating the distortion (for example, the Euclid distortion, the absolute distortion, etc.) between the current vector signal 401 and the reference vector signal $402_{a2}$ and for selecting a block having the minimum distortion from the reference blocks.

The subtractor 45 achieves a subtraction between the current vector signal 401 and the vector signal $402_{b2}$ of the block selected by the movement compensation section 42 and sends the differential vector signal 405 to the vector quantizing/encoding section 43.

The vector quantizing/encoding section 43 comprises an arithmetic section 43a for computing the average value m and the variance o from the differential vector signal 405, a validness/invalidness judgment circuit 43b for judging the validness or invalidness of the selected block based on the average value m, the variance o, and the threshold values $T_1$ and $T_2$ controlling the compression amount of the information volume, a normalizing section 43c for normalizing the differential vector signal 405, a code block 43d for storing patterns of a plurality of the normalized image vector signals, and a vector quantizing section 43e for selecting a pattern from the code book 43c which is the same as or similar to the normalized differential vector signal 403c normalized by the normalizing section 43c and for encoding the selected pattern number, the average m, and the variance $\sigma$.

Next, the flow of the signal will be described.

First, the image input signal 400 is subjected to the block generation in the preprocessing section 41 and is thereby converted into the vector signal 401.

Thereafter, the reference blocks are generated in the movement compensation section. From the reference blocks, a block having the smallest distortion with respect to the vector signal 401 is selected, and then the selection block position information $402_{b1}$ and the selection vector signal $402_{b2}$ are supplied to the subtractor 45.

In the subtractor 45, a subtraction is then accomplished between the vector signal 401 and the selection vector signal $402_{b2}$, and the differential vector signal 405 is delivered to the vector quantizing/encoding section 43.

In the vector quantizing/encoding section 43, the differential vector signal 405 is processed by the arithmetic section 43a to calculate the average value m and the variance $\sigma$ of the differential vector signal 405. Thereafter, the validness/invalidness judgment circuit 43b judges the validness or invalidness as represented by the following expressions by use of the threshold value $T_1$ for the average value and the threshold value $T_2$ for the variance.

$m < T_1$ and $\sigma < T_2$: Invalid $m \geq T_1$ or $\sigma \geq T_2$: Valid

If the judgment results in the invalidness, the current block is assumed to be identical with the selected block and hence only the selection block position information $402_{b1}$ is encoded and the resultant signal is temporarily stored in the transmission data buffer 46.

On the other hand, if the judgment results in the validness, the differential vector signal 405 is normalized as the datum to be transmitted in the normalizing section 43c according to the following formula.

$y_i = (x_i - m)/\sigma$ (where, $i = 1, 2, \ldots, k$)

$\begin{cases} y_i\text{: i-th element of the normalized vector} \\ x_i\text{: i-th element of the differential vector} \end{cases}$ Thereafter, the normalized differential vector signal 403c is quantized and encoded in the vector quantizing section 43e as follows.

First, a pattern which is most similar to the normalized differential vector signal 403c is selected from the code book 43d. As the transmission information, the pattern number, the selection position information $402_{b1}$, the average value m, and the variance $\sigma$ are encoded and the resultant signals are temporarily stored in the transmission data buffer 46.

The image encoded signals temporarily stored in the transmission data buffer 46 are transmitted in the frame-by-frame fashion.

On the other hand, the threshold values $T_1$–$T_2$ are controlled according to the amount of the image encoded signals stored in the transmission data buffer 46 associated with the previous frame such that the threshold values are set to great values for the great amount of the signals and are set to small values for the small amount of the signals, thereby controlling the degree of the compression for each frame.

According to the image encoding/transmitting apparatus shown in FIG. 19 as described above, as a result of the movement compensation processing step, when the differential data between the input block and the selected block is within the threshold value range in the encoding processing step, the selected block is directly reproduced as an image.

Figure 21:
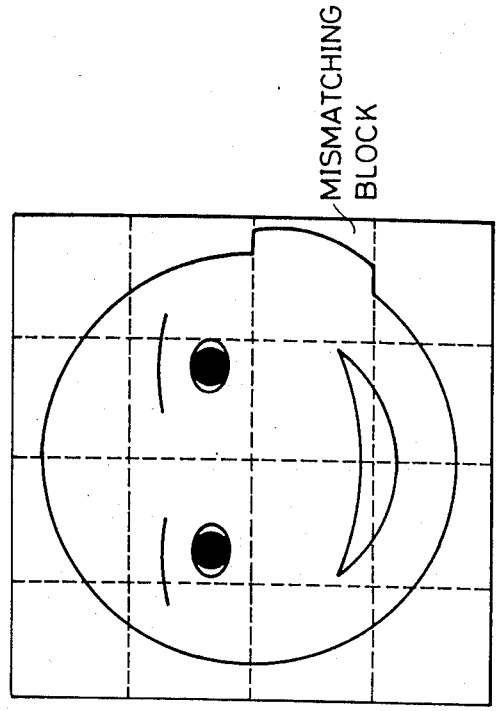
FIG. 21 is an explanatory diagram conceptually illustrating the disadvantage of the general transmitting apparatus of FIG. 19.

In this operation, if the selected block or the input block has a strong contour line even when the differential datum is within the threshold value range, there has been a problem that the contour line is shifted in the image as shown in FIG. 21. This phenomenon is emphasized in a case where the distance between the input block and the selected block is great. Such a problem takes place because the mismatching in the movement compensation cannot be fully compensated.

Next, the fourth embodiment implemented to solve the problem above will be concretely described.

Figure 20A:
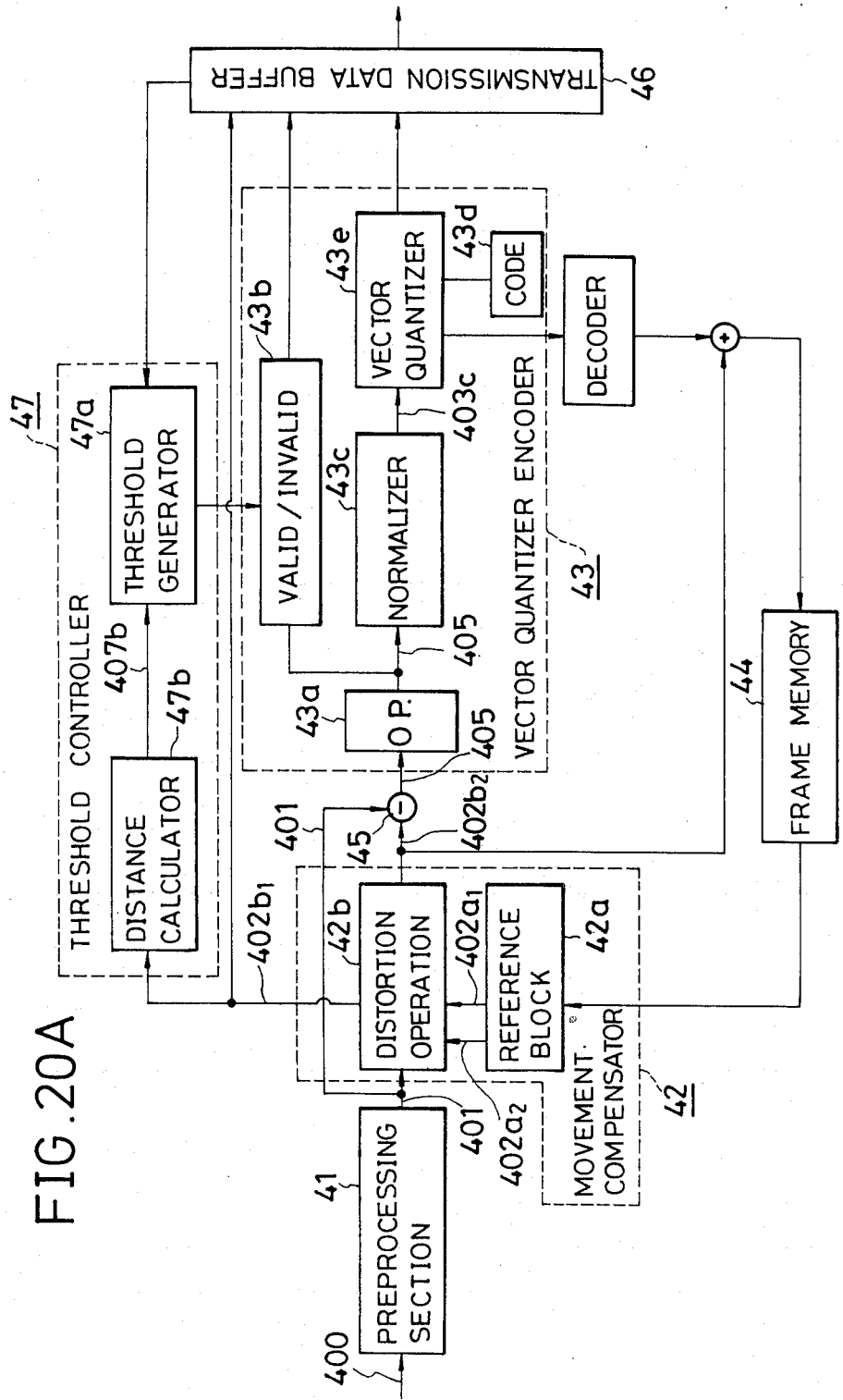
FIG. 20A is a block construction diagram depicting the overall constitution of the image encoding/transmitting apparatus of the fourth embodiment according to the present invention.

FIG. 20A is a block configuration diagram showing the image encoding/transmitting apparatus to which the fourth embodiment is applied. In FIG. 20A, the same reference numerals are assigned to the same components as those of FIG. 19 and the description thereof will be omitted.

Figure 20B:
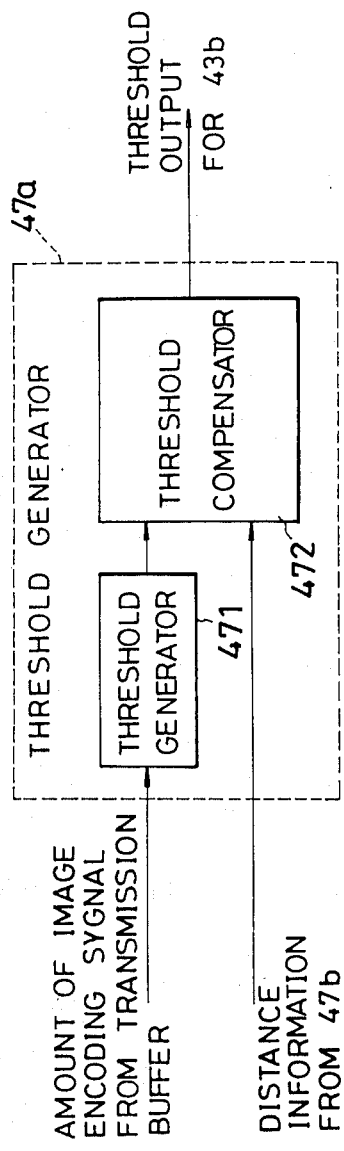
FIG. 20B is a detailed block diagram showing the threshold value control circuit.

The characteristic item of the embodiment is a threshold control section 47 which includes a threshold generating circuit 47a controlled by the amount of the encoded signals temporarily stored in the transmission data buffer 46 for effecting a threshold control such that the threshold value is increased when the amount of the encoded signals is great and the threshold value is decreased when the amount of the encoded signals is small and a distance calculating circuit 47b for calculating the distance between the current input block and the selection block selected by the movement compensation section 42. The threshold generating circuit 47a includes, as shown in FIG. 20B, a threshold generating section 471 and an auxiliary threshold control circuit 472 for decreasing the threshold values based on the calculated distance when the distance is great.

Next, the flow of the signal will be described.

The image input signal 400 is first subjected to the block generation in the preprocessing section 41 so as to be converted into the vector signal 401.

In the movement compensation section 42, reference blocks are generated and a block having the smallest distortion with respect to the vector signal 401 is selected from the reference blocks. Thereafter, the selection block position information $402_{b1}$ and the selection vector signal $402_{b2}$ are supplied to the subtractor 45, while the selection block position information $402_{b1}$ is sent to the distance calculating section 47b of the threshold control section 47.

Figure 20D:
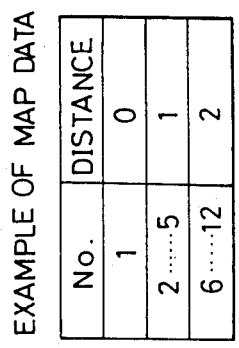
FIG. 20D is a table depicting an example of the map data of the reference block.
Figure 20C:
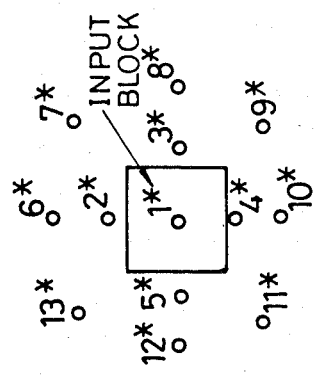
FIG. 20C is a schematic diagram illustrating positions of pixels in a reference block.

The details of the operation will be described with reference to FIGS. 20C–20D. FIG. 20C is a schematic diagram showing positions of pixels of a reference block, namely, pixels exist as indicated by small circles (o), $1^*$–$13^*$. The distortion operation section 42b sends to the distance calculating section 47b the number (one of the numbers 1–13 in this case) of the block having the smallest distortion among the reference blocks. The distance calculating section 47b converts the number into a distance by use of a map data beforehand set as shown in FIG. 20D and then transmits the distance to the threshold generator circuit 47a.

The threshold values $T_1$–$T_2$ are controlled according to the amount of the image encoded signals stored in the transmission data buffer 46 associated with the previous frame such that the threshold values are set to great values for a large amount of the signals and are set to small values for a small amount of the signals; however, when the distance of the output $407_b$ from the distance calculating circuit 47b exceeds a fixed value, the auxiliary control is conducted to reduce the threshold values.

The subtractor 45 effects a subtraction between the vector signal 401 and the selection vector signal $402_{b2}$, and then the differential vector signal 405 is delivered to the vector quantizing/encoding section 43.

Thereafter, in the vector quantizing/encoding section 43, the differential vector signal 405 is processed in the arithmetic section 43a to calculate the average value m and the variance o of the differential vector signal 405. In the validness/invalidness judgment circuit 43b, the validness or invalidness is judged by use of the threshold value $T_1$ for the average and the threshold value $T_2$ for the variance according to the following expressions.

$$m < T_1 \text{ and } \sigma < T_2: \text{Invalid}$$

$$m \geq T_1 \text{ or } \sigma \geq T_2: \text{Valid}$$

In this operation, if there exists a great distance between the current block and the selected block, the control is effected to reduce the threshold values by the threshold control section 47 as described above; consequently, when the distance between the current block and the selected block is large, the possibility of the invalidness is lowered.

If the judgment results in the invalidness, the current block is assumed to be identical with the selected block and only the selection block position information $402_{b1}$ is encoded and the resultant signal is temporarily stored in the transmission data buffer 46.

On the other hand, if the judgment results in the validness, the differential vector signal 405 is normalized as the datum to be transmitted in the normalizing section 43c according to the following formula.

$$y_i = (x_i - m)/\sigma$$

(where, $i = 1, 2, \ldots, k$)

$\begin{cases} y_i\text{: }i\text{-th element of the normalized vector} \\ x_i\text{: }i\text{-th element of the differential vector} \end{cases}$ Thereafter, the normalized differential vector signal 403c is quantized and encoded in the vector quantizing section 43e as follows.

First, a pattern most similar to the normalized differential vector signal 403c is selected from the code book 43d. As the transmission information, the pattern number, the selection position information $402_{b1}$, the average value m, and the variance $\sigma$ are encoded and the resultant signals are temporarily stored in the transmission data buffer 46.

The image encoded signals temporarily stored in the transmission data buffer 46 are transmitted in the frame-by-frame fashion.

According to the embodiment, for a selected block with a great distance for which the possibility of the mismatching is high as a result of the movement compensation, the control is effected to lower the threshold values and to conduct the encoding and transmission of the differential vector signal between the input block signal and the selected block signal, which leads to an effect that the occurrence of the shift of the contour of the block is minimized.

In addition, according to the embodiment, although a description has been given of an example of the auxiliary threshold control in which the threshold values are set to the lower values as the distance between the distance selection block and the input block is increased, the same effect can be attained by conducting a stepwise control in which several kinds of threshold values are provided depending on the distances.

Next, the fifth embodiment of the image encoding/transmitting apparatus will be described according to the present invention.

First, prior to the description of the concrete contents of the fifth embodiment, the general example of the technology adopted as the basis of the fifth embodiment will be described.

Figure 22:
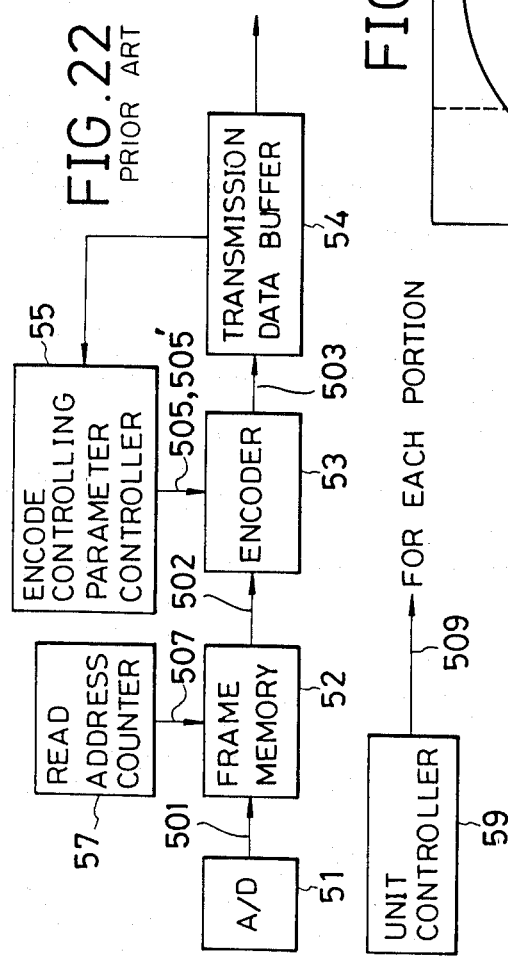
FIG. 22 is a block construction diagram showing the image encoding/transmitting apparatus as a general example and as a basis of a fifth embodiment of the present invention.

FIG. 22 shows the image encoding/transmitting apparatus as the basis of the fifth embodiment.

In the analog/digital converting section (to be referred to as an A/D converting section) 51 of FIG. 22, the pixels obtained by effecting the analog/digital conversion on the image input signals are processed to generate groups each containing k pixels being in the neighborhood of each other in the image, so that for each block, a k-dimensional vector input signal is generated. A frame of vector signals are then stored in the frame memory 52, thereafter the vector signals are transmitted to the encoding section 53 in the block-by-block fashion.

Incidentally, the encoding section 53 is provided with a previous frame memory (not shown) in which the image signals associated with the previous frame with respect to the current image signal are stored in blocks.

The frame memory 52 is supplied with a signal from the read address generating section 57. The apparatus control section 59 outputs control signals to the respective sections.

In the encoding section 53, using as reference blocks a plurality of blocks each including the current vector signal and the block stored in the previous frame memory at a position associated with the block corresponding to the current vector signal, the vector signal and the block position information of the reference block are inputted and then the image information is compressed and encoded as will be described later; thereafter, the encoded image signals are sent to the transmission data buffer 54.

Next, a brief description will be given of the operations to compress and encode the image information.

First, the distortion (such as the Euclid distortion or the absolute distortion) between the current vector signal and the reference vector signal is computed to select a block having the minimum distortion from the reference blocks and then the selected block position information is stored.

A subtraction is then effected between the current vector signal and the vector signal of the selected reference block to calculate the differential vector signal.

The average m and the variance $\sigma$ of the differential vector signal are thereafter obtained and the validness/invalidness is judged according to the following expressions by use of the threshold value $T_1$ for the average and the threshold value $T_2$ for the variance controlling the compression amount of the information volume.

$$m < T_1 \text{ and } \sigma < T_2: \text{Invalid}$$

$$m \geq T_1 \text{ or } \rho \geq T_2: \text{Valid}$$

If the judgment results in the invalidness, the current block is assumed to be identical with the selected block and only the selection block position information and the information indicating the invalid block are encoded, thereby temporarily storing the resultant signals in the transmission data buffer 54.

On the other hand, if the judgment results in the validness, the differential vector signal as the datum to be transmitted is normalized according to the following formula. Assuming the differential vector signal to be $\epsilon = \epsilon_1, \epsilon_2, \ldots, \epsilon_k$ and the vector signal after the normalization to be $x = x_1, x_2, \ldots, x_k$, then $$x = \frac{1}{\sigma}(\epsilon - m)$$

where, $$m = \frac{1}{k} \sum_{i=1}^{k} \epsilon_i, \sigma = \frac{1}{k} \sum_{i=1}^{k} |\epsilon_i - m|$$

Next, the normalized vector signal is subjected to the vector quantization to output the index code I. For details about the vector quantization, refer to the "Image Dynamic Multistage Vector Quantization", the Journal of the Institute of Electronics and Communication Engineer, IE84-18. The average value and the variance are output by effecting the quantizing and encoding operations on the m and $\sigma$. If the result indicates validness, the information notifying the valid block, the index code, and the average and the variance having undergone the quantizing and encoding operations are temporarily stored in the transmission data buffer 54.

From the transmission data buffer 54, the image encoded signals thus encoded are transmitted in the frame-by-frame fashion.

In the encode controlling parameter control section 55, the threshold values are controlled according to the amount of the image encoded signals stored in the transfer data buffer 54 associated with the previous frame. If the amount of the signals is great, the threshold values are set to the greater values; whereas, if the signal amount is small, the threshold values are set to the smaller values, thereby controlling the degree of the compression for each frame.

Moreover, the compression of the image input signal in the conventional image encoding/transmitting method has been achieved by applying the block generation of the image, the differential modulation, and the threshold value control as described above; however, when transmitting an image including a considerable change therein, namely, when transmitting an image having many blocks for which there exists a great difference between the current frame image and the preceding frame image and hence the threshold judgment results in validness (the transmission information is to be required), the compression of the encoded information volume cannot be satisfactorily effected in same cases.

In such a case, a long period of time is necessary to transmit a frame due to the great amount of the information; consequently, the time-lapse control is effected to thin out the input of the image signals for each frame, thereby controlling the information volume. FIG. 26 shows an example of the time-lapse control.

As shown in FIG. 26, the input image frames are input in the sequence of A, B, C, D, E, and F. If the frame A contains a great amount of encoded information, the transmission of the encode information takes a long period of time, and hence in the actual transmission of the encoded information, the frames B and C are omitted, namely, the encoded information is transmitted in the sequence of A, D, E, and F.

According to the image encoding/transmitting method of FIG. 22 as described above, the control of the encoding control parameter such as the threshold values for achieving the smoothing operation of the information generation volume is effected depending on the volume of the encoded signals contained in the preceding frame; consequently, in a case where an abrupt change takes place between frames, the optimum encoding control parameter cannot be attained, which leads to a problem that the appropriate value cannot be obtained for the information generation.

To overcome this difficulty, the fifth embodiment is implemented to solve the problem that the image transmission is attended with the visual unfamiliarity due to the delay of the image transmission time and the time-lapse control associated with the increase of the information generation volume.

Next, the image encoding/transmitting apparatus of the fifth embodiment according to the present invention will be described with reference to FIG. 23.

Figure 23:
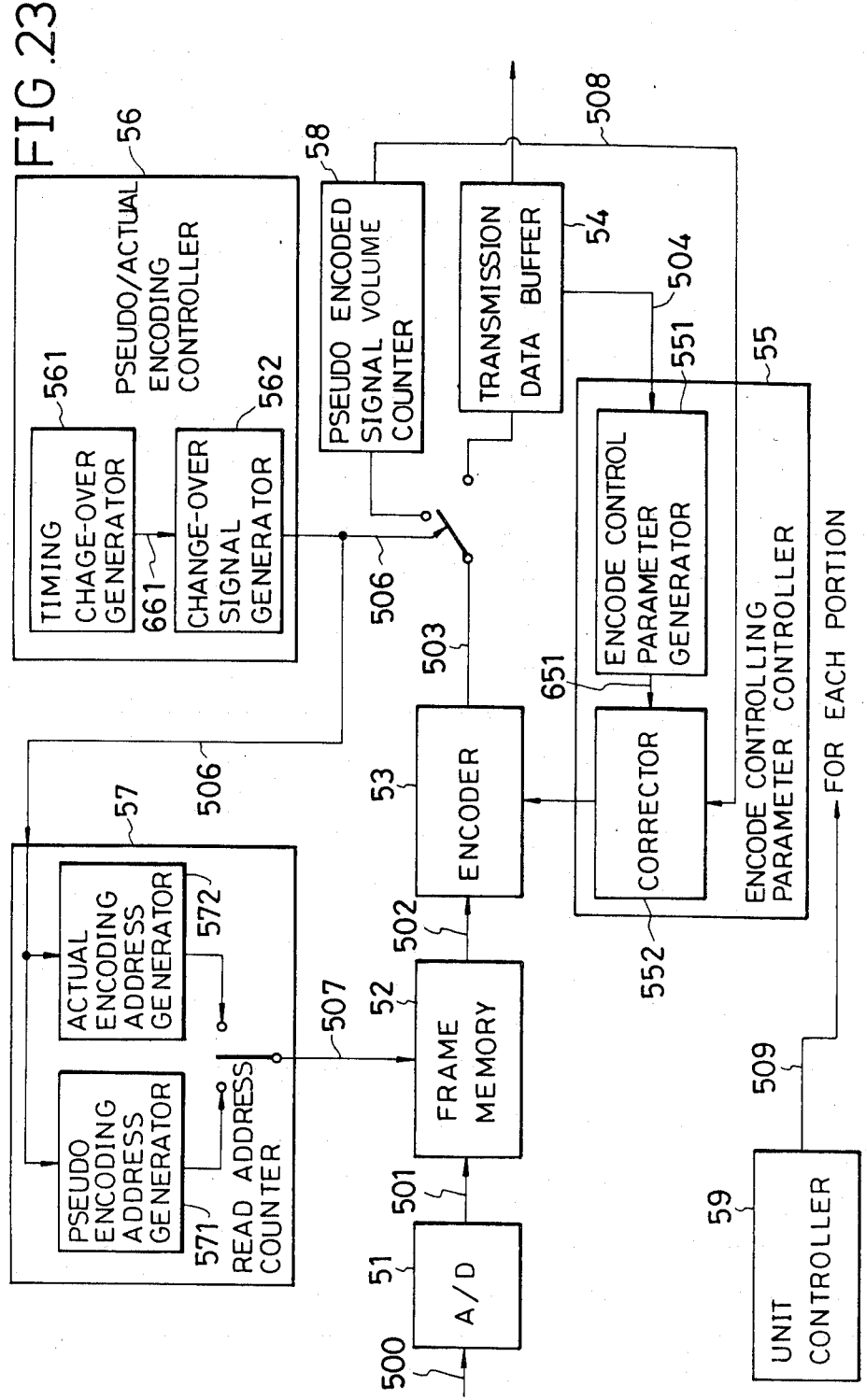
FIG. 23 is a block diagram of the transmitting apparatus of the fifth embodiment according to the present invention.

FIG. 23 is a block configuration diagram illustrating the image encoding/transmitting apparatus of the fifth embodiment in which the same reference numerals are assigned to the same components as those of the prior art technology shown in FIG. 22 and the description thereof will be omitted.

In this apparatus, there is provided a pseudo encoding/actual encoding control circuit 56 for accomplishing the control of the pseudo encoding/actual encoding. This system further includes a read address counter 57 for extracting the input datum for pseudo encoding operation from the digital signals stored in the frame memory 52 and a pseudo encoded signal volume counter 58 for counting the pseudo encoded signal volume.

Next, the flow of the signal will be described.

First, the image input signal 500 is converted into a digital signal 501 by the A/D converting section 51 and the obtained digital signal 501 is stored in the frame memory 52 in the frame-by-frame fashion.

Next, the pseudo encoding is achieved as follows.

First, prior to the actual encoding, the pseudo encoding control signal 506 indicating an execution of a pseudo encoding is read from the pseudo/actual encoding control circuit 56 and is output to the read address counter 57. The read address counter 57 generates a read address for the pseudo encoding and then the pseudo encoding data 502 is extracted from the frame memory 52, for example, for an image constituted by 30 block lines per frame as shown in FIG. 24, namely, the 5-th block line, the 15-th block line, the 25-th block line, etc., thereby sending the extracted signals to the encoding section 53.

Referring now to FIG. 23, the inside of the pseudo/actual encode control section 56 will be described.

The change-over timing generating section 561 receives as an input (not shown) a control signal 509 delivered from the apparatus control section 59 controlling the entire apparatus, recognizes the timing to effect the pseudo or actual encoding based on the control signal 509, and outputs a timing signal 661. The change-over signal generating section 562, based on the timing signal 661, generates the change-over signal. pseudo encode control signal 506 indicating whether the pseudo encoding or the actual encoding is to be effected.

Referring next to FIG. 23, the inside of the read address counter 57 will be described.

When receiving the virtual encode control signal 506 from the pseudo/actual encode control section 56 for the pseudo encoding, the pseudo encode read address generating section 571 generates a pseudo encode read address 571 for the pseudo encoding, whereas the actual encode address generating section 572, when indicated to effect the actual encoding by use of the pseudo encode control signal 506, generates an actual encode read address 572 for the actual encoding. The pseudo encode read address 571 or the actual encode read address 572 is selected according to the pseudo encode control signal 506 and is then outputted as a frame memory read address 507.

In the encoding section 53, a predetermined encoding operation is conducted on the pseudo encoding datum 502 by using the encoding control parameter 505 determined according to the amount of the encoding signals of the preceding frame and then the pseudo encoded signal 503 is sent to the pseudo encoded signal volume counter.

Thereafter, the pseudo encoded signal volume counter 58 counts the signal volume in the pseudo encoding and then based on the output 508, namely, the pseudo encoded signal volume, the encoding control parameter control section 55 corrects the encoding control parameter 505 to calculate the encoding control parameter 505, thereby finishing the pseudo encoding operation.

Referring here to FIG. 23, the inside of the encoding control parameter control section 55 will be described.

Based on the inputted actual encode signal volume 504, the encoding control parameter generating section 551 generates the encoding control parameter 651 for the next encoding operation. The encoding control parameter 651 is directly outputted through the correcting section 552 for the pseudo encoding; whereas for the actual encoding, the correcting section 552 corrects the encoding control parameter 651 according to the inputted pseudo encoded signal volume 508 for the optimal encoding and then the resultant parameter is outputted.

Next, a pseudo encoding control signal 506 indicating to execute the actual encoding is delivered from the pseudo/actual encoding control circuit 56, and based on the encoding control parameter 505 thus corrected, the actual encoding operation is achieved on all digital signals stored in the frame memory 52 in the optimum fashion.

According to the embodiment, the datum is extracted from the input frame, the data is once subjected to the pseudo encoding operation, the encoding control parameter is corrected, the actual encoding is executed, and the image is transmitted; however, the image transmission time is the same as that of the prior art technology.

That is, referring now to FIG. 25(a) illustrating the transmission time of the image encoding/transmitting operations in the configuration of FIG. 22, the encoding time for a frame is from 60 to 70 ms, whereas the line transmission speed is about 100 ms per frame, namely, an idle time of 30 to 40 ms exists before the encoding operation is initiated for the next frame.

Consequently, when the pseudo encoding is achieved during the idle time, the image encoding and transmission can be efficiently executed.

In the embodiment, although the description has been given to an example in which the same encoding method applies to the pseudo encoding and the actual encoding, the same effect can be developed by applying a simplified encoding method to the actual encoding.

Moreover, in the example of the embodiment above, although the correction of the encoding control parameter is achieved through an execution of the pseudo encoding, the same effect or the improved effect can be attained by repetitiously effecting the pseudo encoding and the parameter correction several times.

As described above, according to the fifth embodiment, the datum is extracted from the digital signals contained in an input frame, the pseudo encoding is accomplished on the datum, and the encoding control parameter is corrected depending on the amount of the pseudo encoded signals, which enables to obtain the optimum amount of the encoding signals and to stabilize the image transmission.

While the present invention has been described with reference to the particular illustrative embodiments, it is not restricted by those embodiments but only by the appended claims. It is to be appreciated that those skilled in the art can change and modify the embodiments without departing from the scope and spirit of the invention.

What is claimed is:

1. An image encoding/transmitting apparatus using a differential pulse code modulation system in which an estimated error signal and a threshold value are compared with each other to generate a movement detection signal and a differential signal and the movement detection signal and the differential signal are quantized and thereafter subjected to a transmission and a reception; wherein the polarity of the differential signal is judged in said encoding/transmitting apparatus, a polarity is assigned to the threshold value based on the judgment, the differential signal is corrected depending on the threshold value with the polarity, and the resultant corrected differential signal is quantized and thereby is communicated.

2. An image encoding/transmitting apparatus according to claim 1 wherein said corrected differential signal is generated by subtracting the threshold with the polarity from the differential signal.

3. An image encoding/transmitting apparatus using a differential pulse code modulation system including a transmission circuit for effecting a datum compression and transmission by achieving a differential pulse modulation on a digital input signal and a reception circuit corresponding to the transmission circuit wherein:
said transmission circuit includes:
an estimating circuit for calculating an estimation signal to estimate the digital input signal;
a movement detection circuit for outputting a differential signal depending on an estimated error signal being a difference between the input signal and the estimation signal and a threshold value for smoothing an amount of a transmission data;
a quantizing circuit for quantizing the differential signal;
a transmission data buffer circuit for temporarily storing the quantized transmission signal;
a threshold generating circuit for generating and controlling the threshold value; and
a local decoding circuit for locally decoding the quantized signal to calculate the estimation signal,
wherein said reception circuit includes:
a receiving data buffer circuit for temporarily storing a received signal;
a local decoding circuit for decoding the received signal; and
an adder for calculating a regenerated signal from the decoded signal and the estimation signal,
wherein said quantizing circuit includes:
an adaptive quantizing circuit having a plurality of quantization characteristics and a characteristic selecting circuit for selecting said quantizing characteristic depending on the threshold value, and
wherein said local decoding circuits of said transmission circuit and said reception circuit each includes:
an adaptive local decoding circuit having a plurality of decoding characteristics corresponding to the quantizing circuit and
a characteristic selecting circuit for selecting said decoding characteristic depending on the threshold value.

4. An image encoding/transmitting apparatus according to claim 3 wherein said quantizing characteristic selected by said quantizing circuit is such that a quantization output of the differential signal within an invalid data range (within a specification of the corresponding threshold value) is "0".

5. An image encoding/transmitting apparatus including a vector quantizer wherein said vector quantizer comprises:
a quantization preprocessing circuit for subsampling an image signal, for thinning out pixels from the image signal according to a pixel ratio, and for generating from the pixel signal an n-dimensional vector;
a group of input buffers for respectively storing each said input vector in a sequence of a quantization processing and for repetitiously reading the input vector at an interval of the processing period;
a vector output circuit for beforehand preparing an output vector corresponding to a probability distribution of the input vector and for selecting and outputting the output vector based on an index input;
a distortion computation circuit for computing a distance between the input vector and the output vector selected and output;
a plurality of encoding sections disposed corresponding to the buffers;
index output generating means for generating an index for a period of a subsequent processing based on the calculated distance value outputted from said each encoding section and the input vector and for sending the index to each said vector output circuit; and a quantized index output circuit for generating an index of a quantizer from said generated index and for outputting the index.

6. An image encoding/transmitting method comprising:
   a preprocessing step for generating blocks of pixels, each block containing a plurality pixels in the neighborhood of each other in an image of an image input signal, for generating a vector signal for each said block, and for outputting said vector signal;
   a movement compensation processing step for generating a plurality of reference blocks by use of a frame memory storing an image of vector signals ahead in time by one frame with respect to a current vector signal, each said reference block including a block existing at a same position as a current input block, for respectively calculating a reference vector signal, for achieving a distortion computation between the vector signal and each said reference vector signal, for selecting a block having a minimum distortion, and for outputting a position information of the selected block;
   an encoding processing step for calculating a differential vector signal by executing a subtraction between the input block and the selected block, for encoding only the position information of the selected block in a case where an average value and a variance of the differential vector signal each are within a range of a threshold value and for calculating an encoded signal, and for sending the encoded signal to a transmission data buffer; and for encoding the position information of the selected block and the differential vector signal in a case where the average and the variance of the differential vector signal is beyond the range of the threshold and for sending the encoded signal to the transmission data buffer;
   a threshold value control step for controlling the threshold value depending on an amount of the encoded signal temporarily stored in the transmission data buffer, for decreasing the threshold value when the encoded signal amount is small, and for increasing the threshold value when the encoded signal amount is great; and
   an auxiliary threshold control step for reducing the threshold value when a distance between the current input block and the selected block calculated by the movement compensation step is great.

7. An image encoding/transmitting method according to claim 6 wherein a sum of absolute values of said differential vector signals is calculated and the sum of absolute values and the threshold value are utilized.

8. An image encoding/transmitting method comprising:
   a preprocessing step for effecting an analog-to-digital conversion on an image input signal to generate a digital signal and for storing the digital signal in a frame memory for each frame;
   an encoding processing step for effecting a smoothing operation on the digital signal based on an encoding control parameter such as a threshold value and for encoding the smoothed digital signal;
   a transmission control processing step for temporarily storing the encoded signal for each frame in a transmission data buffer and for sending the encoded signal to a transmission control unit;
   an encoding control parameter control step for controlling the encoding control parameter based on an amount of the encoded signals temporarily stored in the transmission data buffer associated with a previous frame; and
   an auxiliary encoding control parameter control step for extracting a portion of a current digital signal stored in the frame memory, for effecting a pseudo encoding on the portion based on the encoding control parameter calculated depending on the amount of the encoded signals of the preceding frame, and for correcting the encoding control parameter based on an amount of the pseudo encoded signals having undergone the pseudo encoding, thereby causing the encoding control parameter to have an optimum value.

* * * * *

UNITED STATES PATENT AND TRADEMARK OFFICE
CERTIFICATE OF CORRECTION

PATENT NO. : 4,809,067
DATED : February 28, 1989
INVENTOR(S) : HIROAKI KIKUCHI ET AL.

It is certified that error appears in the above-identified patent and that said Letters Patent is hereby corrected as shown below:

Front Page, Col. 1, [54], line 2, after "ENCODING" insert a comma --,--;
Front Page, Col. 1, [54], line 3, "IMAGE" should be --IMAGES--.

Col. 4, line 56, after "and" insert --a--.

Col. 7, line 12, delete "a".

Col. 8, line 38, delete "threshold".

Col. 12, line 14, "(valid)" should be --(invalid)--;
Col. 12, line 29, "Shad 5" should be --$S_5$--.

Col. 13, line 42, "an" should be --a--.

Col. 17, line 53, "o" should be --$\sigma$--;
Col. 17, line 57, "o" should be --$\sigma$--.

Signed and Sealed this

Thirteenth Day of November, 1990

Attest:

HARRY F. MANBECK, JR.

Attesting Officer

Commissioner of Patents and Trademarks